United States Patent [19]

McInally

[11] Patent Number: 5,608,856

[45] Date of Patent: Mar. 4, 1997

[54] COMPUTER GRAPHICS APPARATUS AND METHOD FOR INTERPOLATING CONTROL VALUES TO GENERATE IMAGE DATA

[75] Inventor: Thomas C. McInally, Farnborough, England

[73] Assignee: Canon Kabushiki Kaisha, Tokyo, Japan

[21] Appl. No.: 249,910

[22] Filed: May 26, 1994

[30]     Foreign Application Priority Data

May 28, 1993 [GB] United Kingdom .................... 9311157

[51] Int. Cl.$^6$ .................................................. G06T 11/00
[52] U.S. Cl. ............................................................ 395/142
[58] Field of Search ...................................... 395/142, 133, 395/150, 151, 152, 155, 161, 162; 382/300, 242, 260, 261, 264, 265, 232; 318/568.1

[56]                References Cited

U.S. PATENT DOCUMENTS 5,140,236   8/1992   Kawamura et al. .................. 318/568.1

OTHER PUBLICATIONS

"Computer & Graphics", vol. 7, No. 2, Jul. 1983, GB pp. 149–153, Lozover et al.
"Computer Graphics & Image Processing", vol. 7, No. 3, Jun. 1978, USA pp. 425–437, Yamaguchi.
"Computer Graphics & Image Processing", vol. 14, 1980 USA pp. 203–226, Barsky.
"Computer Vision, Graphics and Image Processing", vol. 52, No. 2, Nov. 1990, USA pp. 264–275 XP172322, Goshtasby et al.
"Computer–Aided Design", vol. 23, No. 10, Dec., 1991, GB pp. 700–706 XP247377, Cheng et al.
"Interactive Computer Graphics; Functional, Procedural and Device–Level Methods", Sec. 6.3.1, pp. 260–264 Peter Burger et al.
B. A. Barsky & S. W. Thomas, "Transpline—A system for representing curves B–Line".

"B–Spline Surface Interpolation Using SLOR Method with Parallel Relaxation", Tech. Rep. No. 94–87, Dept. of Computer Science, University Kentucky.
"Numerical Recipes in C, The Art of Scientific Computing" by Press, Flannery, Teukolsky & Vetterling, Cambridge Press, 1988.
Graphics Gems, pub. by Academic Press Professional, "An Algorithm for automatically Fitting Digitized Curves" by Philip J. Schneider.
"Computer Graphics, Principles and Practice", by Foley vanDam et al.
Computer Vision, Graphics and Image Processing 33 (1986) Mar., No. 3, pp. 346–363, "Automatic Curve Fitting with Quadratic B–spline Functions and its Application to Computer–Assisted Animation" by Yang et al.
"An Introduction to Splines for use in Computer Graphics and Geometric Modeling" by Bartels, Beatty & Barsley, published by Morgan Kaufman.

*Primary Examiner*—Almis R. Jankus
*Attorney, Agent, or Firm*—Fitzpatrick, Cella, Harper & Scinto

[57]                ABSTRACT

In an image synthesis system, a definer/editor (102) stores (1112) object definitions in the form of control points for spline curves. The system can generate "phantom control points" ($A_0$ to $A_{N+1}$) to define a spline object, such that the curve interpolates a desired set of points ($P_1$ to $P_N$) received from a user, for example via a mouse or graphics tablet. While the number N of received points, is variable, and may be large, the system operates quickly to generate coefficients ($X_{ij}$) which can be used to derive the phantom control points (A), without the need for matrix inversion, and without storing a large number of pre-inverted matrices. This permits intuitive interaction with the user for the definition of spline objects. For large numbers N where interactivity may even so become difficult to achieve, the system is able to generate approximate phantom points, each derived from a relatively small sub-set of the received points.

46 Claims, 18 Drawing Sheets

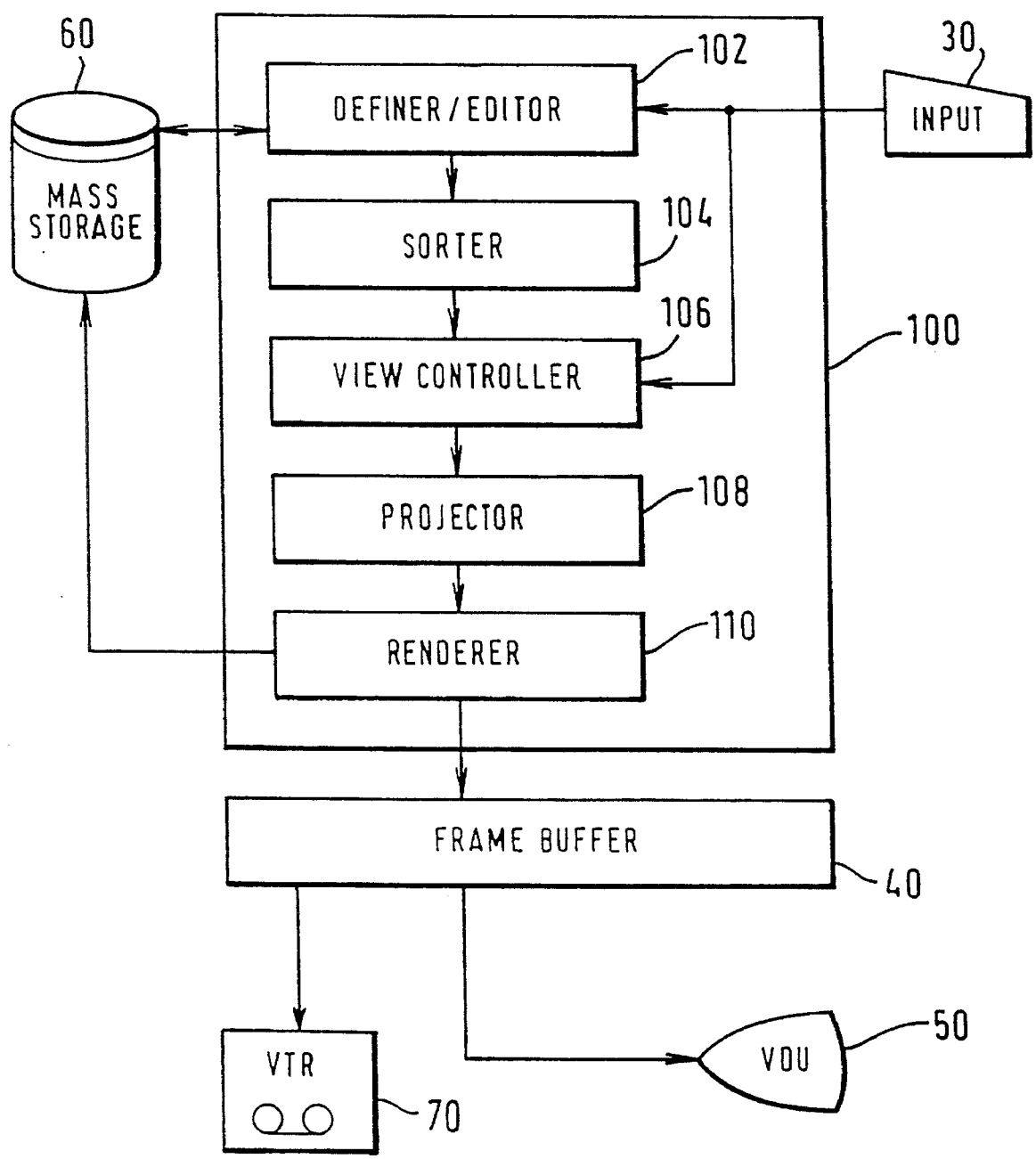

FIG.3(a)
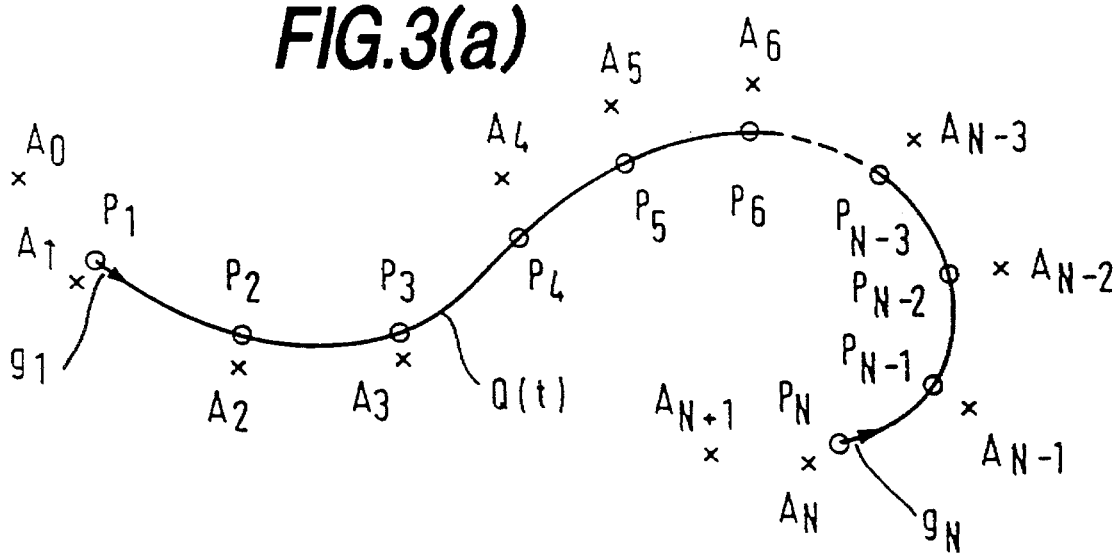
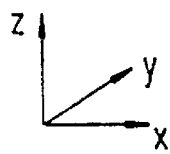
FIG.3(b)
$$Q(t) = \sum_{i=0}^{N+1} A_i \cdot B(i - Nt)$$
$$B(\tau) = \frac{1}{6}(2+\tau)^3 \qquad -2 \leq \tau < -1$$
$$= \frac{1}{6}(4 - 6\tau^2 - 3\tau^3) \quad , \quad -1 \leq \tau < 0$$
$$= \frac{1}{6}(4 - 6\tau^2 + 3\tau^3) \quad , \quad 0 \leq \tau < 1$$
$$= \frac{1}{6}(2-\tau)^3 \quad , \quad 1 \leq \tau < 2$$
$$= 0 \qquad , \quad 2 \leq |\tau|$$

FIG.4(a)

$$P_1 = \frac{1}{6}A_0 + \frac{2}{3}A_1 + \frac{1}{6}A_2$$

$$P_2 = \frac{1}{6}A_1 + \frac{2}{3}A_2 + \frac{1}{6}A_3$$

$$P_3 = \frac{1}{6}A_2 + \frac{2}{3}A_3 + \frac{1}{6}A_4$$

$$P_4 = \frac{1}{6}A_3 + \frac{2}{3}A_4 + \frac{1}{6}A_5$$

$$g_1 = -\frac{N-1}{2}A_0 + \frac{N-1}{2}A_2$$

$$g_4 = -\frac{N-1}{2}A_3 + \frac{N-1}{2}A_5$$

FIG.4(b)

$$\begin{bmatrix} -\frac{N-1}{2} & 0 & \frac{N-1}{2} & 0 & 0 & 0 \\ \frac{1}{6} & \frac{2}{3} & \frac{1}{6} & 0 & 0 & 0 \\ 0 & \frac{1}{6} & \frac{2}{3} & \frac{1}{6} & 0 & 0 \\ 0 & 0 & \frac{1}{6} & \frac{2}{3} & \frac{1}{6} & 0 \\ 0 & 0 & 0 & \frac{1}{6} & \frac{2}{3} & \frac{1}{6} \\ 0 & 0 & 0 & -\frac{N-1}{2} & 0 & \frac{N-1}{2} \end{bmatrix} \begin{bmatrix} A_0 \\ A_1 \\ A_2 \\ A_3 \\ A_4 \\ A_5 \end{bmatrix} = M \begin{bmatrix} A_0 \\ A_1 \\ A_2 \\ A_3 \\ A_4 \\ A_5 \end{bmatrix} = \begin{bmatrix} g_1 \\ P_1 \\ P_2 \\ P_3 \\ P_4 \\ g_4 \end{bmatrix}$$

FIG.6

$$X_{00} = \frac{2}{N-1}\left(\frac{1}{6}X_{01} - 1\right),$$

$$X_{i0} = \frac{2}{N-1} \cdot \frac{1}{6} \cdot X_{i1}, \quad i = 1, 2, \ldots N+1$$

FIG.5(a)

| $X_{00}$ | X | X | X | X | $X_{05}$ |
|---|---|---|---|---|---|
| $X_{10}$ | 26 | X | X | X | X |
| $X_{20}$ | -7 | X | X | X | X |
| $X_{30}$ | 2 | X | X | X | X |
| $X_{40}$ | -1 | X | X | $X_{44}$ | $X_{45}$ |
| $X_{50}$ | X | X | X | $X_{54}$ | $X_{55}$ |

FIG.5(b)

| $X_{00}$ | X | X | X | X | X |
|---|---|---|---|---|---|
| X | 26 | X | X | X | X |
| X | -7 | 28 | X | X | X |
| X | 2 | -8 | X | X | X |
| X | -1 | 4 | X | X | X |
| $X_{50}$ | X | X | X | X | $X_{55}$ |

FIG.5(c)

| $X_{00}$ | X | X | X | X | X |
|---|---|---|---|---|---|
| X | 26 | X | X | X | X |
| X | -7 | 28 | X | X | X |
| X | 2 | -8 | 28 | X | X |
| X | -1 | 4 | -14 | X | X |
| $X_{50}$ | X | X | X | X | $X_{55}$ |

FIG.5(d)

| X | X | X | X | X | X |
|---|---|---|---|---|---|
| X | 26/15 | X | X | X | X |
| X | -7/15 | 28/15 | X | X | X |
| X | 2/15 | -8/15 | 28/15 | X | X |
| X | -1/15 | 4/15 | -14/15 | X | X |
| X | X | X | X | X | X |

FIG.5(e)

| X | X | X | X | X | X |
|---|---|---|---|---|---|
| X | 26/15 | -14/15 | 4/15 | -1/15 | X |
| X | -7/15 | 28/15 | -8/15 | 2/15 | X |
| X | 2/15 | -8/15 | 28/15 | -7/15 | X |
| X | -1/15 | 4/15 | -14/15 | 26/15 | X |
| X | X | X | X | X | X |

FIG.5(f)

| X | -7/15 | 28/15 | -8/15 | 2/15 | X |
|---|---|---|---|---|---|
| X | 26/15 | -14/15 | 4/15 | -1/15 | X |
| X | -7/15 | 28/15 | -8/15 | 2/15 | X |
| X | 2/15 | -8/15 | 28/15 | -7/15 | X |
| X | -1/15 | 4/15 | -14/15 | 26/15 | X |
| X | X | X | X | X | X |

FIG.5(g)

$$\begin{array}{cccccc}
X & -7/15 & 28/15 & -8/15 & 2/15 & X \\
X & 26/15 & -14/15 & 4/15 & -1/15 & X \\
X & -7/15 & 28/15 & -8/15 & 2/15 & X \\
X & 2/15 & -8/15 & 28/15 & -7/15 & X \\
X & -1/15 & 4/15 & -14/15 & 26/15 & X \\
X & 2/15 & -8/15 & 28/15 & -7/15 & X \\
\end{array}$$

FIG.5(h)

$$\begin{array}{cccccc}
-\frac{97}{135} & -7/15 & 28/15 & -8/15 & 2/15 & X \\
\frac{26}{135} & 26/15 & -14/15 & 4/15 & -1/15 & X \\
-\frac{7}{135} & -7/15 & 28/15 & -8/15 & 2/15 & X \\
\frac{2}{135} & 2/15 & -8/15 & 28/15 & -7/15 & X \\
-\frac{1}{135} & -1/15 & 4/15 & -14/15 & 26/15 & X \\
\frac{2}{135} & 2/15 & -8/15 & 28/15 & -7/15 & X \\
\end{array}$$

FIG.5(i)

$$M^{-1} = \begin{bmatrix}
-\frac{97}{135} & -7/15 & 28/15 & -8/15 & 2/15 & -\frac{2}{135} \\
\frac{26}{135} & 26/15 & -14/15 & 4/15 & -1/15 & \frac{1}{135} \\
-\frac{7}{135} & -7/15 & 28/15 & -8/15 & 2/15 & -\frac{2}{135} \\
\frac{2}{135} & 2/15 & -8/15 & 28/15 & -7/15 & \frac{7}{135} \\
-\frac{1}{135} & -1/15 & 4/15 & -14/15 & 26/15 & -\frac{26}{135} \\
\frac{2}{135} & 2/15 & -8/15 & 28/15 & -7/15 & \frac{97}{135} \\
\end{bmatrix}$$

$$P_1 = \frac{1}{6}A_4 + \frac{2}{3}A_1 + \frac{1}{6}A_2$$

$$P_2 = \frac{1}{6}A_1 + \frac{2}{3}A_2 + \frac{1}{6}A_3$$

$$P_3 = \frac{1}{6}A_2 + \frac{2}{3}A_3 + \frac{1}{6}A_4$$

$$P_4 = \frac{1}{6}A_3 + \frac{2}{3}A_4 + \frac{1}{6}A_1$$

$$M \cdot A = \begin{bmatrix} \frac{2}{3} & \frac{1}{6} & 0 & \frac{1}{6} \\ \frac{1}{6} & \frac{2}{3} & \frac{1}{6} & 0 \\ 0 & \frac{1}{6} & \frac{2}{3} & \frac{1}{6} \\ \frac{1}{6} & 0 & \frac{1}{6} & \frac{2}{3} \end{bmatrix} \begin{bmatrix} A_1 \\ A_2 \\ A_3 \\ A_4 \end{bmatrix} = \begin{bmatrix} P_1 \\ P_2 \\ P_3 \\ P_4 \end{bmatrix} = P$$

FIG.9(a) $RS'_i = 1, -2, 7 \quad (i = 1, \ldots 1+\frac{M}{2})$
(N=4)

FIG.9(b) $\frac{RS'_i}{d} = 1/4, -1/2, 7/2$

FIG.9(c) $[\; 1/4 \quad -1/2 \quad 7/2 \quad X \;]$

FIG.9(d) $[\; 1/4 \quad -1/2 \quad 7/2 \quad -1/2 \;]$

FIG.9(e) $\begin{bmatrix} 7/2 & -1/2 & 1/4 & -1/2 \\ -1/2 & 7/2 & -1/2 & 1/4 \\ 1/4 & -1/2 & 7/2 & -1/2 \\ -1/2 & 1/4 & -1/2 & 7/2 \end{bmatrix} \begin{bmatrix} P_1 \\ P_2 \\ P_3 \\ P_4 \end{bmatrix} = \begin{bmatrix} A_1 \\ A_2 \\ A_3 \\ A_4 \end{bmatrix}$

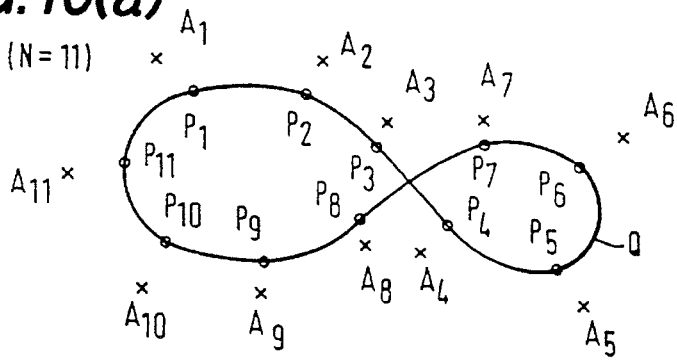

FIG.10(b)

$$\begin{Bmatrix} P_1 \\ P_2 \\ P_3 \\ \vdots \\ P_{11} \end{Bmatrix} = \begin{bmatrix} \frac{2}{3} & \frac{1}{6} & 0 & 0 & 0 & 0 & 0 & 0 & 0 & 0 & \frac{1}{6} \\ \frac{1}{6} & \frac{2}{3} & \frac{1}{6} & 0 & 0 & 0 & 0 & 0 & 0 & 0 & 0 \\ 0 & \frac{1}{6} & \frac{2}{3} & \frac{1}{6} & 0 & 0 & 0 & 0 & 0 & 0 & 0 \\ \vdots & & & & & & & & & & \vdots \\ \frac{1}{6} & 0 & 0 & 0 & 0 & 0 & 0 & 0 & 0 & \frac{1}{6} & \frac{2}{3} \end{bmatrix} \begin{Bmatrix} A_1 \\ A_2 \\ A_3 \\ \vdots \\ A_{11} \end{Bmatrix}$$

FIG.10(c)

$OS_i = 1, 3, 11, 41, 153, 571 \quad (i=1,...(1+\frac{N}{2}))$ $d = OS_{(1+\frac{N}{2})} = 571$

FIG.10(d)

$RS_i = 1, 5, 19, 71, 265, 989 \quad (i=1,...(1+\frac{N}{2}))$ $RS'_i = -1, 5, -19, 71, -265, 989$ $\frac{RS'_i}{d} = \frac{-1}{571}, \frac{5}{571}, \frac{-19}{571}, \frac{71}{571}, \frac{-265}{571}, \frac{989}{571}$ $$FIG.10(e) \begin{bmatrix} \frac{-1}{571} & \frac{5}{571} & \frac{-19}{571} & \frac{71}{571} & \frac{-265}{571} & \frac{989}{571} & x & x & x & x & x \end{bmatrix}$$

$$FIG.10(f) \begin{bmatrix} \frac{-1}{571} & \frac{5}{571} & \frac{-19}{571} & \frac{71}{571} & \frac{-265}{571} & \frac{989}{571} & \frac{-265}{571} & \frac{71}{571} & \frac{-19}{571} & \frac{5}{571} & \frac{-1}{571} \end{bmatrix}$$

FIG.14

| N | ... | 7 | 8 | 9 | 10 | 11 | 12 | 13 | 14 | ... |
|---|-----|---|---|---|----|----|----|----|----|-----|
| $\frac{N-1}{2}$ | ... | 3 | 3 | 4 | 4 | 5 | 5 | 6 | 6 | ... |
| $\frac{N}{2}$ | ... | 3 | 4 | 4 | 5 | 5 | 6 | 6 | 7 | ... |
| $\frac{N+1}{2}$ | ... | 4 | 4 | 5 | 5 | 6 | 6 | 7 | 7 | ... |

$$\frac{N-1}{2} = \begin{cases} \frac{N}{2}, & N = 1, 3, 5, \ldots \\ \frac{N}{2} - 1, & N = 2, 4, 6 \ldots \end{cases}$$

$$\frac{N+1}{2} = \begin{cases} \frac{N}{2} + 1, & N = 1, 3, 5, \ldots \\ \frac{N}{2}, & N = 2, 4, 6, \ldots \end{cases}$$

$(i-j)^* = (N-1+i-j) \% N + 1 \qquad (i+j)^* = (-1+i+j) \% N + 1$ ($N = 100$ ; $N' = 11$)

$1500 \longrightarrow [\, RS'_1 \; RS'_2 \; RS'_3 \; RS'_4 \; RS'_5 \; RS'_6 \; RS'_5 \; RS'_4 \; RS'_3 \; RS'_2 \; RS'_1 \,]$ $i = 1 \ldots N$ $$A_i = \frac{1}{d}\left[ \sum_{j=1}^{N'/2} RS'_{\frac{N'}{2}+1-j} \cdot P_{(i-j)^*} + RS'_{\frac{N'}{2}+1} \cdot P_i + \sum_{j=1}^{\frac{N'-1}{2}} RS'_{\frac{N'}{2}+1-j} \cdot P_{(i+j)^*} \right]$$

$(i-j)^* = (N-1+i-j)\%N+1$       $(i+j)^* = (-1+i+j)\%N+1$ $A_0 = A_{100}$ ;     $A_{101} = A_1$ ;     $A_{102} = A_2$

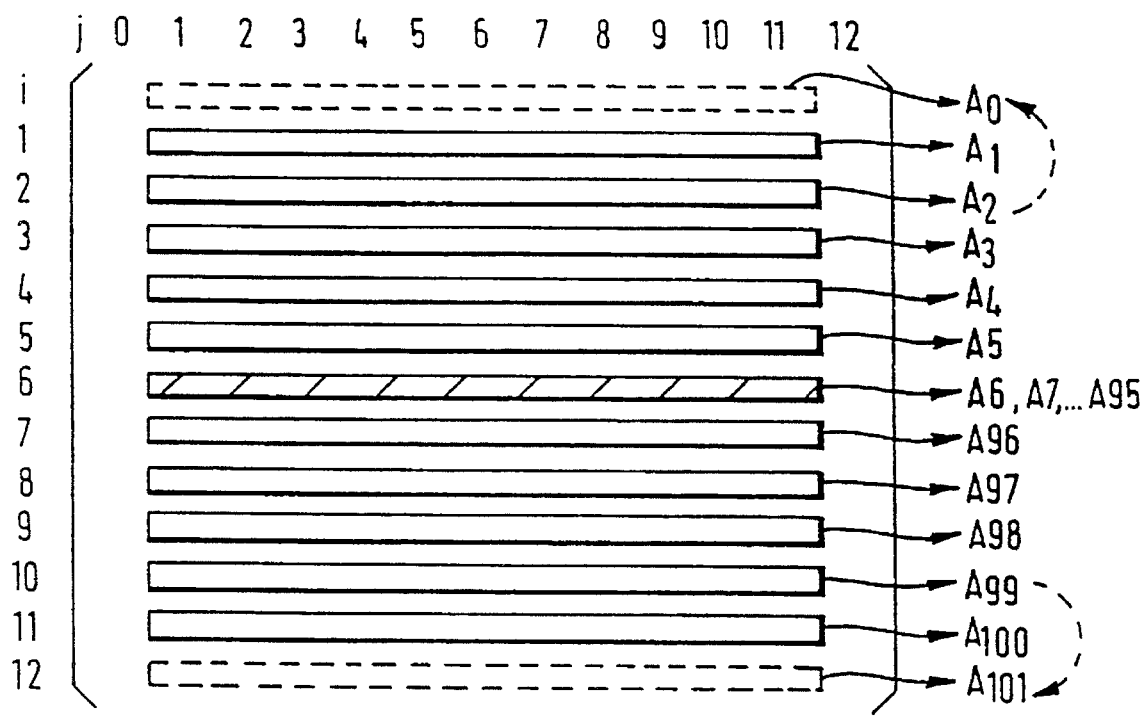

$(N = 100 ; N^{0'} = 11 ; g_1, g_N \neq 0)$

COMPUTER GRAPHICS APPARATUS AND METHOD FOR INTERPOLATING CONTROL VALUES TO GENERATE IMAGE DATA

The invention relates to methods and apparatus for interpolating received values. In particular, the invention relates to methods and apparatus for deriving a set of control values for a parametric curve, from a large set of received values, such that the curve approximately interpolates the received values.

The applications of the invention are many and varied, but particular examples include computer graphics systems, computer aided design systems, robotics and numerical control. The received values may be simple one-dimensional values, but in the above applications, two and three-dimensional values representing points on an image, or points in three-dimensional space, are of particular interest. Accordingly, the invention also relates to image synthesis systems and to picture or motion picture recordings made using such apparatus.

In these applications, it is frequently desirable to generate values which interpolate a set of received values in a smooth and continuous manner. A popular technique for this purpose is to employ a parametric definition of the interpolating curve, such that the curve is defined by a set of blending equations and a set of control values (control points in a multi-dimensional space). By varying a single parameter, any point on the curve can be generated. Parametric cubic curves in particular have desirable aesthetic and physical properties, and include for example Bezier curves and cubic spline curves. The so-called B-spline curves are useful in that they allow control of the curve by any number of control values, while requiring only modest computational effort to generate an interpolated value.

In "Interactive Computer Graphics; Functional, Procedural and Device-Level Methods" by Peter Burger and Duncan Gillies, published by Addison Wesley Publishing Company, ISBN0-201-17439-1, cubic B-splines and other parametric curves are described. The reference indicates that a disadvantage of the cubic B-spline curves is the fact that the generated curve does not in fact interpolate the control values, so that to generate a curve which interpolates a set of received (user-specified) points in space requires the generation of a set of "phantom" control values which cause the curve to interpolate the desired values. A set of simultaneous equations can be derived, which defines each phantom control value in terms of the set of received control values.

Unfortunately, for a set of N received values, to obtain the equations for the N phantom values requires the solution of N simultaneous equations, or in equivalent terms, the inversion of a matrix of N by N coefficients. While the cubic B-spline curve representation itself is useful when the number of control values is large and variable, the solution of N simultaneous equations to obtain the phantom values imposes a great computational burden, such that in many systems, interactive definition of such curves is not possible.

The problem of the large computational burden in generating phantom values from received values has been addressed in a number of prior art documents.

The reference by Burger and Gillies proposes in Section 6.3.1 that inverted matrices can be generated for a range of values N, such that for a set of received points of any size N, the phantom values can readily be calculated. When N becomes large, however, for example reaching 100, several megabytes of memory would be consumed in the storage of these inverse matrices.

In another technique, disclosed in the article "B-spline curves and surfaces viewed as digital filters" by Goshtasby, Cheng and Barsby, in Computer Vision, Graphics and Image Processing, vol.52, no.2, November 1990, USA pages 264–275, B-splines are treated as a class of digital filters and an "inverse filtering operation" is used to determine the phantom values of a B-spline curve. In this technique, a uniform B-spline curve is viewed as a signal, with the user-input control points to be interpolated corresponding to sample points. The method assumes that the control points are equally spaced, and determines the phantom values by computing the Fourier transform of the control values vector, computing the Fourier transform of the basis segment coefficients vector, dividing the former by the latter point-by-point, and finding the inverse Fourier transform of the result.

As a further technique, an invention claimed in our unpublished copending British Patent Application 9311152.4 (Agent's ref. 2251201) provides for direct generation of the coefficients necessary for generating the phantom control values, with less computational burden. Although this other invention can allow the interactive definition of parametric cubic curves interpolating the set of received values such that the user can see the resulting curve at the same time as generating or modifying the set of values which are to be interpolated, this becomes increasingly difficult for very large numbers of points.

Often, however, an approximate interpolation will be sufficient, particularly when the images are being displayed at a limited resolution. Other references describe the generation of approximately interpolating curves, by methods of least squares analysis and the like.

The article "A new curve fitting method using a crt computer display" by Yamaguchi in Computer Graphics and Image Processing, vol.7, no.3, June 1978, USA pages 425–437, discloses another technique for generating approximate phantom values of a uniform cubic B-spline. In this technique, an iterative algorithm is used. In the initial state, each phantom value is set to that of the corresponding received value. Subsequently, the phantom values are varied in an iterative manner towards the ideal phantom values, achieving a desired degree of precision after some number of iterations.

The present invention provides an apparatus for generating desired values lying on a curve which interpolates approximately a set of N received control values, the apparatus comprising:

means for generating from the received value a set of phantom control values; and means for generating one or more interpolated values by using the phantom control values in a parametric equation, wherein the means for generating the phantom control values comprises means for combining respective subsets of N' (fewer than N) of the received values in accordance with a set of N' coefficients, in particular such that the set of N' coefficients is used repeatedly and combined with a respective different subset of the received control values to generate each of at least a middle subset of the desired phantom control values.

The invention also provides a method for generating desired values lying on a curve which interpolates approximately a set of N received control values, the method comprising:

generating from the received value a set of phantom control values; and generating one or more interpolated values by using the phantom control values in a parametric equation, wherein the step of generating the phantom control values comprises combining respective subsets of N' (fewer than N) of the received values in accordance with a set of N' coefficients, in particular such that the set of N' coefficients is used repeatedly and combined with a respective different subset of the received control values to generate each of at least a middle subset of the desired phantom control values.

Such an apparatus or method may be provided and used independently of the other invention mentioned above, or alternatively provide a more interactive, approximate interpolation mode in an apparatus embodying the first aspect of the invention, as described above.

The set of coefficients may be generated by storing terms of at least one numerical sequence and selecting these terms in accordance with predetermined rules. This sequence may typically be defined by a recurrence relation, and starting values which may depend on the type of curve desired (open/closed, N' odd/N' even).

In the event that the curve is a closed curve, such that the received control values form a closed sequence, a single set of coefficients may be used repeatedly to combine a different respective subset of N' received control values in order to generate each respective phantom control value.

In the event that the curve is an open-ended curve, plural sets of coefficients may be stored to define rows of a two-dimensional matrix, while a first subset of phantom control values are generated by combining a first subset of the received control values in accordance with respective rows of a first subset of the rows of the coefficient matrix, a last subset of the phantom control values are generated by combining respective rows of a last subset of the rows of the coefficient matrix with a last subset of the received control values, and a middle subset of the phantom control values are generated by combining a middle row of the coefficient matrix with respective subsets of the received control values. Default end conditions may be assumed for the curve, such that the coefficients in a first and last column of the matrix need not be stored.

In the above embodiments, it is an advantage that the set of coefficients depends on N', determined by the degree of accuracy required in the approximation, and not upon the number of values to be interpolated. Thus, just one set of coefficients, or matrix of coefficients need be stored for the generation of the phantom control values, no matter what number N of values are specified by the user for interpolation. Nonetheless, the value N' can be determined adaptively to achieve any desired accuracy of interpolation.

It is an advantage of the invention that the appratus may comprise a commercially available data processing apparatus, configured to operate in accordance with the invention by programming signals supplied on a record carrier or received via other communication links. Accordingly, the invention still further provides data signals and record carriers adapted for this purpose.

The invention yet further provides image synthesis methods and apparatuses wherein the interpolated values are used, and picture or motion picture recordings produced using such apparatuses and methods. These and further features and advantages of the invention will be understood by the skilled reader from a consideration of the following description and the appended claims.

BRIEF DESCRIPTION OF THE DRAWINGS

Embodiments of the invention will now be described, with reference to the accompanying drawings, in which:

FIG. 2 is a block diagram showing illustratively the operational structure of the processor of the apparatus of FIG. 1;

FIGS. 3(a) and 3(b) illustrate the technique of interpolating a received set of points by the generation of phantom points for controlling a cubic parametric curve;

FIGS. 4(a) and 4(b) illustrate relationships between received points and phantom points for an example with four received points $P_1$ to $P_4$;

FIGS. 5(a) to 5(i) show various steps (a) to (i) in the generation of a matrix of coefficients for generating the phantom points for the example with N=4;

FIG. 6 presents two formulae for use in the method of FIG. 5;

FIGS. 9(a) to 9(f) illustrate steps (a) to (f) in a method of generating the phantom points in the example of FIG. 7;

FIGS. 10(a) to 10(f) illustrate steps (a) to (f) in the generation of the phantom points for a closed loop case with N=11 received points;

FIG. 14 illustrates the operation of integer arithmetic in the example of FIGS. 13(a) and 13(b);

FIG. 16 illustrates the generation of phantom points for approximate interpolation of an open-ended curve with N=100 received points and zero end gradient conditions;

GENERAL DESCRIPTION OF APPARATUS

Figure 1:
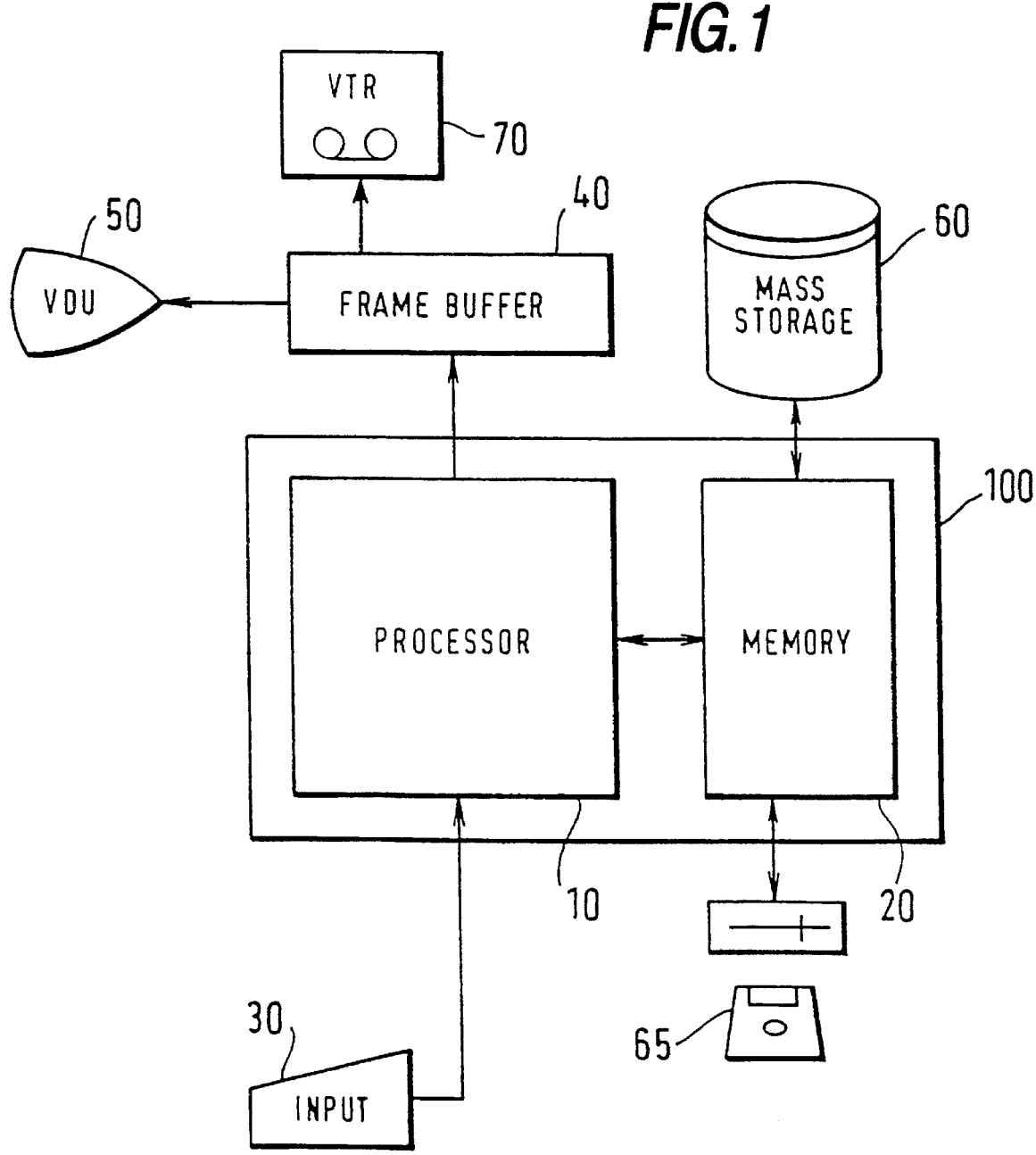
FIG. 1 is a block diagram showing schematically apparatus according to one embodiment of the invention.

FIG. 1 is a block diagram showing the general arrangement of apparatus according to one embodiment of the invention. The apparatus comprises a processor 10 (for example a microprocessor) coupled to a memory 20 operable to store a program defining the sequence of operations of the processor 10, and to store object and image data used and calculated by the processor 10. Coupled to an input port of the processor 10 is an input device 30, which may comprise a keyboard but will typically also comprise a position sensitive input device such as a "mouse", tracker ball, digitizer tablet and stylus and so on.

Also coupled to the processor 10 is a frame buffer 40 comprising a memory unit arranged to store image data relating to at least one image, usually by providing one (or several) memory location(s) per point or picture element (pixel) of the image. The address within the frame buffer 40 of the data relating to each pixel is related to the position within the image of that pixel (in other words the frame buffer 40 is memory mapped). The value stored in the frame buffer for each pixel defines the colour of that pixel in the image. The term "colour" of course should be understood to include monochrome (greyscale) intensity values, as well as multi-component colour values such as RGB values (red, green, blue).

Images are generally two dimensional arrays of image elements, and are conventionally described in terms of Cartesian coordinates, so that the position of a given pixel can be described by a pair of x, y coordinates; this is convenient when, for example, the image is to be displayed upon a raster scan display units since the x and y coordinates map to the distance along a line and the number of the line, respectively. The number of picture elements in an image dictates the resolution of the image. Thus, for an image having a resolution of (for example) 1,000 times 1,000 pixels, the frame buffer 40 is required to include $10^6$ pixel locations, each addressable directly or indirectly in terms of pixel coordinates x, y.

Coupled to the frame buffer 40 is a display unit 50, arranged in conventional fashion to be driven by a signal corresponding to the image stored in the frame buffer 40 at a normal frame repetition rate of 5–50 frames per second (typically 25 or 30). Coupled to the memory 20 (typically via the processor 10) and possibly also to the frame buffer 40, is a mass storage device 60 such as a hard disc drive, having a high capacity for data so as to be capable of storing several images or image or object data to be loaded into the memory 20.

Also coupled to the frame buffer is a video tape recorder (VTR) or other image recording device 70. This can not only record in real time the sequence of images displayed but can be used to capture a sequence of more complex or higher quality images at slower than real-time, so that they can be replayed subsequently as a computer-generated motion picture recording. Of course the resolution of the recording device need not be equal to that of the VDU 50, so that for example a paper printer or 35 mm film recorder can be used to record very high quality versions of images after the image content has been defined interactively by the user via the lower quality medium of display unit 50.

It is an advantage of the present embodiments that the processor 10 and memory 20, and optionally also the frame buffer 40, display unit 50 and mass storage device 60, may be commercially available as a complete system, for example a personal computer (PC) or a workstation unit such as the Sparc Station available from Sun Microsystems. Embodiments of the invention can then be supplied commercially in the form of programs stored on a floppy disk 65 or other medium, or transmitted over a data link, so that the customer's hardware becomes re-configured into an apparatus embodying the invention.

FIG. 2 shows the operational structure of the apparatus, and the overall operation of the apparatus will now be described. The computer 100 performs a number of different operations at different times, executing corresponding stored programs within the memory 20, and therefore comprises (together with the memory 20) means 102–110 for performing such operations; these means are illustratively shown in FIG. 2 as separate although in the described embodiment all are performed by the processor 10 in cooperation with the memory 20. It will of course be understood, however, that separate processors or dedicated logic circuits, operatively interconnected, could be provided to execute each function.

The embodiment may thus be viewed as comprising, firstly, a definer or editor 102 arranged to define the shape of a two- or three-dimensional object to be animated and likewise, optionally, to edit the object. Typically, the definer 102 is connected to the mass storage device 60 to enable an object, once defined, to be stored for subsequent use, and the editor 102 is connected to the input device 30 to enable an operator to alter the object. However other input and output devices (for example, other computers connected via a network) may be provided in addition to, or instead of the input device 30 and mass storage device 60. As will be described in greater detail below, in this embodiment the data defining an object is data representing control points or vertices of a plurality of curves or curved surfaces (typically, parametric cubic surfaces) making up the object. Defining only the control points enables a relatively compact representation of a smoothly curved surface, which may include a sustantial number of picture elements, as well as being independent of the resolution in which the images of the object are reproduced.

In the present embodiment, the computer 100 comprises sorter 104 for performing an initial operation of sorting the surfaces or regions of the object into an order determining the order in which they will be drawn (ie rendered into the frame buffer 40) so as to draw last those regions which will occlude others. The sorter 104 accordingly reads the object data defined by the definer 102 and generates a corresponding sorted list of regions for subsequent use, prior to drawing and all subsequent animation or movement of the object.

The appearance of the object on a two dimensional screen such as the display unit 50, and consequently the image data stored in the frame buffer 40, is dependent upon the direction from which the object is to be viewed; it may also be dependent upon a defined distance between the object and a notional view point corresponding to the plane of the display unit 50. The computer 100 therefore includes view control means 106 enabling an operator to define a view direction or direction and distance (for example, by defining the coordinates of a view point and/or a direction), via the input device 30. Rather than defining individual view points one at a time, the input means 30 may be employed to define a trajectory of successive view points or viewing directions, for example by specifying a direction of movement and a speed, so that successively rendered images are animated. Such a trajectory is also conveniently represented by control points defining a parametric curve.

The data defining the view direction and/or distance defines a relative distance and direction between the object and the notional plane of the display unit 50 (notional view point). Where only a single object is to be displayed, the data may define either the position and orientation of the object or of the screen, since what matters is the relative inclination between the two. On the other hand, where multiple objects at mutually defined positions are to be drawn, the view controller 106 preferably is capable of defining either the view position or a new position for one object at a time, so that either one object may be moved independently or the view may be moved relative to all objects.

Having defined the relative orientation of the object, relative to the viewing plane corresponding to the display unit 50, the computer 100 has the necessary data to enable projection means 108 to perform a projection of the or each three dimensional object into the two dimensional viewing plane. Each two dimensional viewing plane region thus projected by the projector 108 is then rendered, in the order previously defined by the sorter 104, by a renderer 110 which fills the region (i.e., allocates an appropriate colour value to each pixel location in the frame buffer 40 which lies within the region). As is discussed in detail in our copending application (2170501), only regions which face outwardly of the object ("forward facing") need to be rendered. The renderer 110 therefore is arranged to test each region to determine the direction which, in the projected plane, it is facing. Having rendered all regions and written the corresponding image data into the frame buffer 40, the view controller 106 updates the view point, if necessary, and, at least if the view point has changed, the projector 108 and renderer 110 re-execute their respective processes as above.

As mentioned above, view controller 106, projector 108 and renderer 110 are responsive to sets of control points defining curved surfaces and trajectories. The present invention finds application in the definer/editor 102, whereby a user of the system is enabled to define these control points in an intuitive manner.

Interpolation of Received Points by a B-Spline Curve

FIG. 3($a$) illustrates a curve Q(t) which it is desired to define in a three-dimensional space. Axes x, y and z are shown in the Figure.

The coordinates in the three-dimensional space of all points along the curve Q can be calculated through parametric cubic equations, such as B-spline equations, as is known from the references. Parametric cubic curves, such as the B-spline curve have many desirable features, in particular in that they allow the rendering of smoothly varying curves in two- or three-dimensional space with relatively modest computational requirements. To recreate the curve, all that is necessary is to calculate a weighted average of coordinates of a set of control points $A_i$ (marked "x" in the figure) in accordance with a blending function. The entire curve is thus defined by a series of equations which are polynomials in a parameter t. By varying the parameter from 0.0 to 1.0 in desired increments, any and all points on the curve can be generated. The equation for each point Q(t) is shown in FIG. 3($b$), along with a definition of the cubic B-spline blending function B, which is a piecewise cubic function.

An advantage of B-spline curve generation is that each point on the curve Q depends on at most the four nearest control point positions, while any number of control points can be used to define the entire curve. Thus the computational performance required to render any point on the curve is modest, and is independent of the number of control points. A disadvantage of the spline curves, as discussed in the reference by Burger & Gillies, is that the curve does not actually pass through the control points which define it. A common desire for the user of the system is to define manually or by tracing around a known object a set of points in space and to have a curved surface or a trajectory generated which smoothly interpolates between and through these points.

For example the user of the system shown in FIGS. 1 and 2 may use the digitising table or other input means 30 to supply to the definer and editor 102 the coordinates of N points $P_1$ to $P_N$ through which he desires curve Q to pass. It is described in the references how the definer and editor 102 must then generate from the points $P_1$ to $P_N$ received from the user a set of phantom points $A_0$ to $A_{N+1}$, which can then be used as the control points defining of the B-spline curve.

In addition to the received points $P_1$ to $P_N$, two further constraints are required to completely define the curve Q. In particular the user defines (or adopts default values for) two gradient vectors $g_1$ and $g_N$, which are of unit length but define the direction of the curve desired at the end points $P_1$ and $P_N$, with respect to the parameter t. It will be appreciated throughout the above and the following description each "point" and gradient can be a multi-dimensional value (vector). In the present system, two and three-dimensional values of the form (x, y) and (x, y, z) are particularly appropriate.

From the general equation defining the interpolating B-spline curve Q(t) and its differential dQ/dt, the received points $P_i$ and the gradients $g_1$ and $g_N$ can be defined simply in terms of the phantom points $A_i$ as shown in the equations of FIG. 4($a$).

In part (a) of FIG. 4 the value of N=4 is adopted, to form the basis of a simple worked example in the following description. It can be seen that for the case of N=4 given control points ($P_1$ to $P_4$), there are six simultaneous equations. Part (b) of FIG. 4 shows the six equations as they may be written in matrix form. A first coefficient matrix M is defined which is an N+2 by N+2 square matrix. A column matrix A is defined containing as its rows the set of phantom points $A_0$ to $A_{N+1}$, while another column matrix P is defined whose rows contain (top to bottom) $g_1$, $P_1$ to $P_N$ and $g_N$. Thus a single matrix equation M.A=P defines the set of simultaneous equations of FIG. 4($a$).

A central portion of this 6 by 6 matrix M can be seen to have a regular structure, with the pattern ⅙, ⅔, ⅙ repeated in each row centred on the main diagonal. The entire matrix M is thus defined by a set of rules dependent on the constant spline equations and on the variable number N of received control points $P_i$. Now, what is actually required is to calculate the phantom points A from the received points P. The references propose that for this one can use a matrix of coefficients which is the inverse $M^{-1}$ of matrix M, since it follows from the equation M.A=P that $A=M^{-1}$.P.

As can be seen from FIG. 4($a$) and ($b$), each control point $P_i$ can be seen to be a combination of just three of the phantom points $A_i$ and most entries of matrix M are simply zero. However, the same is not true of the inverse matrix $M^{-1}$, with the consequence that each phantom point $A_i$ depends to some extent on all of the given points $P_i$ and gradients $g_1$ and $g_N$. In the prior art it is described how for different values of N the inverse matrix can be pre-calculated by Gaussian elimination and stored for future look-up. For large and variable numbers of points, however, it is impractical to store such a large number of large matrices. On the other hand to calculate the inverse matrix for a large number of points may require so much processor time, that it effectively prevents interactive operation.

Example for Open-Ended Curves

FIGS. 5($a$) to 5($i$) show in steps (a) to (i) an alternative method implemented in the present apparatus, whereby the inverse matrix $M^{-1}$ can be generated directly from knowledge of the rules defining matrix M and the size of the matrix desired. In contrast with traditional methods such as Gaussian elimination, there is no need actually to construct the full matrix M nor to construct a second matrix equal to the identity matrix. By way of explanation, the identity matrix is well known to be that matrix whose entries are 1 on the main diagonal (i=j) and 0 elsewhere (i≠j). At each step in FIGS. 5($a$) to 5($i$) the as yet undefined entries in this example matrix $M^{-1}$ are shown with crosses "X". In accordance with the conventions of matrix notation, any specific entry can be referred to as $X_{ij}$, this being the entry "X" in the row i and column j of the matrix. For reasons of consistency between examples, the first row and column are in this context identified by index values i=0 and j=0 respectively.

The apparatus operates in accordance with pre-stored rules derived by inspection of the desired inverse matrices, and these rules are expressed so as to define two numerical series referred to herein as the "divisor series" and the "column series". Terms $DS_i$ in the divisor series are defined by two initial values and a recurrence relation as follows.

$DS_1=1$;

$DS_2=4$ and $DS_i=4.DS_{i-1}-DS_{i-2}$, where i is 3, 4, 5 etc.

The values of the divisor series are therefore 1, 4, 15, 56, 209 and so on. A divisor d is defined for the inverse matrix $M^{-1}$, which divisor is the (N−1)th term in the divisor sequence, $DS_{N-1}$. Therefore in the example where control points $P_1$ to $P_4$ are defined (N=4), the divisor d is 15. Having calculated the divisor, the divisor series serves no further purpose.

The column series CS is defined by its first two values and a recurrence relation as follows.

$CS_1=1$;

$CS_2=2$; and $CS_i=4.CS_{i-1}-CS_{i-2}$, where i is 3, 4, 5 etc.

The values in the column series are therefore 1, 2, 7, 26, 97 and so on. The apparatus calculates the first N terms in the column series and stores these for future use.

The apparatus then creates a modified column series CS', by negating every second term in the series, starting from the penultimate term $CS_{N-1}$ and working backwards. For the example where N=4, the modified column series is therefore −1, 2, −7, 26. (For N=5 it would be 1, −2, 7, −26, 97.)

A multiplier m is also defined for the procedure, depending on whether the number of given points N is even or odd as follows.

m=−2.0 where N is even;

m=2.0 where N is odd.

Having defined the modified column series CS', the divisor d and the multiplier m, the apparatus is now in a position to generate directly the desired inverse matrix $M^{-1}$ in accordance with some simple rules. For the example where N=4, the steps will now be described with reference to FIGS. 5(a) to 5(i) showing steps (a) to (i).

Initially the apparatus concerns itself with the generation of an inner square matrix of size N by N, ignoring the first and last columns and the first and last rows of the full inverse matrix. This inner matrix is bounded by a dashed box in FIG. 5(a).

As shown in FIG. 5(a) the first column of the inner matrix (where j=1, because for the first column j=0) is defined simply by reading in the four terms of the modified column series starting at the bottom left corner ($X_{41}$). In steps (b) and (c) the apparatus generates further entries in the lower diagonal half (i=1 to 4; j<=i) of the inner matrix as follows.

In step (b) values for the third column of the matrix (second column of the inner matrix (j=2)) are generated from the third row (i=2) to the (N+1)th row (i=4) by multiplying the corresponding entries in the second column (i=1) formed in step (a) by the multiplier m and the second term $CS'_2$ in the modified column series. That is to say, these entries in the third column comprise the corresponding entries in the second column multiplied by −2 (N is even) and $CS'_2=2$. For example, $X_{22}=-7\times-2\times2=28$.

In step (c) the lower two entries in the fourth column of the matrix (third column of the inner matrix) are generated in a similar manner, this time multiplying the entries in the corresponding row of the second column of the matrix by the multiplier and the third term $CS'_3$ in the modified column series. For example, the entry $X_{43}$ in the fifth row and the fourth column of the matrix is −14, this being the product of −1, m=−2 and $CS'_3=-7$.

In step (d) the coefficients calculated so far are all divided by the divisor d=15 calculated from the divisor series DS as described above. In step (e) the values of the lower diagonal half of the inner matrix are copied into corresponding positions in the upper diagonal half, according to a symmetry rule, whereby each column in the right hand half of the inner matrix is a "upside down" copy of a corresponding column in the left hand half.

In FIG. 5(f) showing step (f) the first row (i=0) of the matrix is generated by copying the third row (i=2), while in step (g) the bottom row of the matrix is generated by copying the row third from the bottom (i=N−1=3). At this point it only remains to generate the first column and the last column of the desired inverse matrix $M^{-1}$.

The definition of an inverse matrix means that the product of matrix M and the inverse matrix $M^{-1}$ must be equal to the identity matrix I of size N+2 by N+2. From this relationship, and from the special form of the matrix M, simple formulae have been found which can be used to calculate the values missing from the first column of the inverse matrix using the entries in the inner part of the inverse matrix already found.

FIG. 6 shows these formulae, including a first equation which expresses the first $X_{00}$ in terms of N and entry $X_{01}$, and a second equation which expresses each remaining entry $X_{i0}$ in terms of N and the adjacent entry $X_{i1}$.

Returning to the situation shown in FIG. 5(g), it will be appreciated that the equations shown in FIG. 6, which are predetermined by the form of matrix M, can now be used to generate all entries $X_{00}$ to $X_{50}$ in the first column of the inverse matrix. Since N=4 in the example of FIGS. 5(a) to 5(i), the factor 2/(N−1) has the value ⅔, while the value $X_{01}$ has the value −7/15. The first equation in FIG. 6 is thus used by the apparatus to derive the value −97/135 for the entry $X_{00}$. The second equation in FIG. 6 is similarly used to derive from the entries in the second column of the matrix the remaining entries $X_{10}$ to $X_{50}$. In step (i) showing FIG. 5(i) the right hand column of the inverse matrix (j=N+1) is generated by copying the entries from the first column just derived, but reading from bottom to top and negating each one.

This completes the derivation of the inverse matrix $M^{-1}$. From this the definer 102 calculates the parametric control points $A_0$ to $A_{N+1}$ from the given points $P_1$ to $P_N$.

Although in FIGS. 5(a) to 5(i) the specific example where N=4 is illustrated, it has been found that general rules can be defined enabling the apparatus to form the inverse of such a matrix for arbitrary values of N. These rules will be set out more explicitly later, with reference to FIGS. 11 to 14. It will be convenient at this point, however, to consider some variations on the types of curve that can be interpolated.

A particular variation of the above method is useful in the special case where the end gradient vectors $g_1$ and $g_N$ are both set to 0. This simplifies operation for the user, who has merely to define points $P_i$ for interpolation, while still producing a satisfactory result in many cases. When the end gradients are 0, moreover, the first and last columns of the inverse matrix $M^{-1}$ become redundant and need not be calculated. Accordingly, the process illustrated in FIGS. 5(a)

to 5(i) can be terminated after step (g), such that the phantom points $A_0$ to $A_5$ are effectively defined only in terms of the four given control points $P_1$ to $P_4$. Furthermore, it will be noted that in FIG. 5(g) the first row of the matrix is identical to the third row and the last row is identical to the third last row. Consequently the first phantom point A0 is identical phantom point $A_2$, and point $A_{N+1}$ is identical to phantom point $A_{N-1}$. A further saving in processing effort can therefore be obtained by stopping the process of FIGS. 5(a) to 5(i) after step (e), using the inner matrix to generate the four phantom points $A_1$ to $A_4$ from the received points $P_1$ to $P_4$, and simply copying the generated phantom points $A_2$ and $A_{N-1}$ to generate the phantom points $A_0$ and $A_{N+1}$ respectively.

Examples of Closed Curves

Figures 7, 8A, 8B:
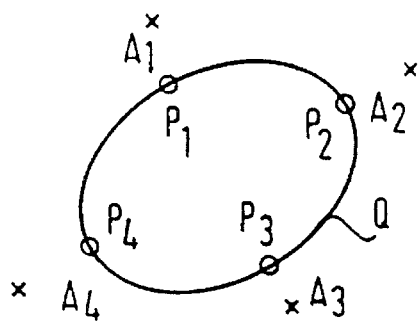
FIG. 7 illustrates another example with N=4 received points, in particular for the generation of a closed curve interpolating those points.
FIGS. 8(a) and 8(b) illustrate relationships between the relationships between the received points and phantom points in the example of FIG. 7.

FIG. 7 illustrates a closed loop case in which, for example, N=4, such that four received points P1 to P4, defined by the user, completly define a continuous closed curve Q. FIG. 8(a) shows (a) the four simultaneous equations defining received points $P_1$ to $P_4$ which are to be interpolated, in terms of the four phantom points $A_1$ to $A_4$. The pattern of coefficients ⅙, ⅔, and ⅙ can be seen clearly in these equations, and in the equivalent matrix equation shown in FIG. 8(b). This pattern is repeated on each row of the new matrix M, which corresponds closely to just the inner part of the matrix M of the open ended example (FIG. 4). The pattern is shifted from row to row of the matrix so as to be centred on the main diagonal, while the coefficent of ⅙ which would appear beyond the top left of the matrix is "wrapped around" to the top right positions and similarly the coefficient from the bottom right is wrapped around to appear at the bottom left.

This "wrap-around" feature follows from the observation that the choice of which point is the first point and which point is the last point on a closed curve is quite arbitrary. It is a corollary of this observation that the inverse matrix $M^{-1}$ will also contain rows which are identical except for a cyclical shift in the position of the entries. Accordingly, the apparatus operates for a closed curve to calculate explicitly only one row of the inverse matrix, which is then applied to the received points $P_i$ in a cyclic fashion to generate the corresponding phantom points $A_i$. In fact since this repeating row will be symetrical about one of the coefficients, it has been appreciated that only half of one row of the matrix need be calculated explicitly. The procedure adopted in the present example is as follows.

Referring to the steps (a) to (f) shown in FIGS. 9(a) to 9(f), two numerical series are calculated as for the open ended curve. In this case, again the series are a divisor series DS and a row series RS. The formulae for the series terms DS and RS depend on whether the number N of received points in the curve is odd or even. If N is even, the series are defined as follows:

$DS_1=1$;

$DS_2=4$; and $DS_i=4.DS_{i-1}-DS_{i-2}$, where i=3, 4, 5 etc $d=DS_{N/2}$ $RS_1=1$;

$RS_2=2$; and $RS_i=4.RS_{i-1}-RS_{i-2}$, where i=3, 4, 5 etc

For the case where N is odd the series are defined as follows:

$DS_1=1$;

$DS_2=3$; and $DS_i=4.DS_{i-1}-DS_{i-2}$, where i=3, 4, 5 etc $d=DS_{1+N/2}$ $RS_1=1$ $RS_2=5$; and $RS_i=4.DS_{i-1}-DS_{i-2}$; where i=3, 4, 5 etc A divisor d is calculated from the divisor series as defined above, such that $d=DS_{N/2}$ when N is even and $d=DS_{1+N/2}$ when N is odd. It will be seen below that using integer arithmetic, both of these expressions can be combined to obtain the single formula $d=DS_{(N+1)/2}$.

The row series RS is calculated to a length of 1+N/2 terms (where N/2 is rounded down by virtue of the integer arithmetic employed), such that for the case where N=4 the row series comprises three terms 1, 2 and 7. As for the column series CS of the first example a modified row series RS' is generated by negating every second term of the row series, starting with the penultimate term and counting backwards. Thus for N=4 the modified row series RS' is 1, −2, 7. These terms of the modified row series are then simply divided (step (b)) by the divisor (d=4), to form 1+N/2 of the desired coefficients (step (c)). The remaining coefficients are then generated by "reflecting" the coefficients about the (1+N/2)th coefficient. The result (FIG. 9(d)) is the (1+N/2)th row of the desired inverse matrix with the other rows merely being shifted copies of the same as shown in FIG. 9(e).

As shown in step (f), shown in FIG. 9(f), additional points $A_5$ and A (that is, $A_{N+1}$ and $A_{N+2}$) are defined which are simply copies of the first two generated points $A_1$ and $A_2$. This is convenient for subsequent processing in which the generated points $A_i$ are used as control points for generating a spline curve, in that the same procedure can be used for both the open ended and closed curves, without worrying about wrap-around in the closed curve case.

FIGS. 10(a) to 10(f) illustrates the corresponding procedure for a larger closed curve defined by an odd number N=11 of points. FIG. 10(a) shows the curve Q, which interpolates user-specified control points $P_1$ to $P_{11}$ and is defined by phantom control points $A_1$ to $A_{11}$. The system of eleven linear equations defining the user specified points $P_i$ in terms of the phantom points $A_i$ is shown in matix form in FIG. 10(b). The regular structure of an 11×11 matrix of coefficients can be seen clearly, in which the pattern ⅙, ⅔, ⅙ is again repeated along the main diagonal. In the references it would be proposed simply to invert this matrix, but the present apparatus operates to calculate the desired phantom points $A_1$ to $A_{11}$ more directly, as follows.

In step (c) the divisor series DS is calculated up to 6 terms, and the sixth term is selected as the divisor d=571. In step (d) the row series RS is calculated, also to 6 terms and then the modified row series RS' is generated by negating every second term, starting from the second last generated term. The modified row series RS is then divided by the divisor d, to generate the first 6 terms of the middle row of the desired inverse matrix (step (e)). In step (f) the remaining terms of the middle row of the desired inverse matrix are generated by "reflecting" on either side of the sixth term.

Generalised Embodiment

Following from the above examples, the operation of the apparatus can now be defined in more formal and general terms, with reference to the flow charts of FIGS. 11 to 13(b).

Figure 11:
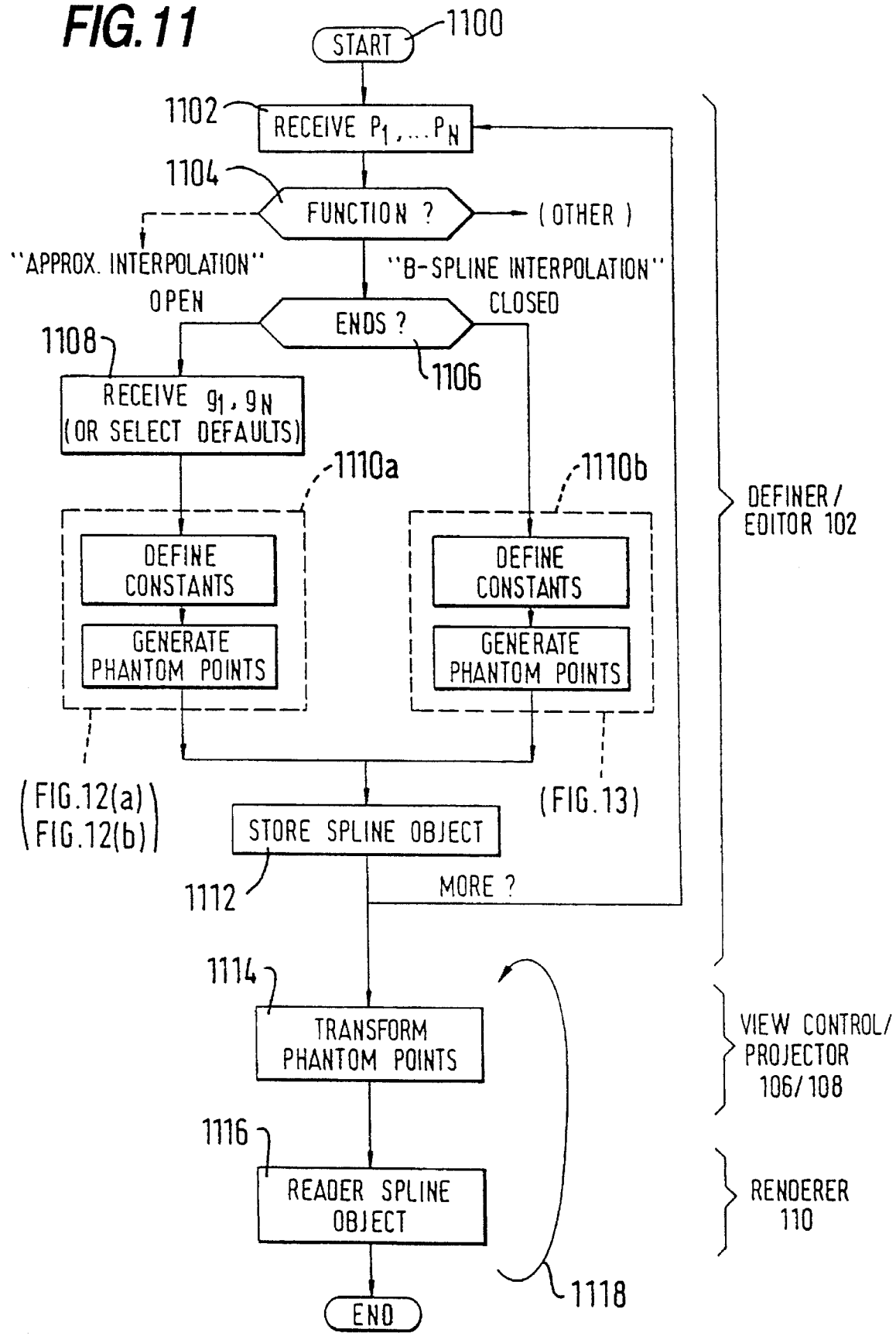
FIG. 11 is a flow chart giving an overview of the operation of the apparatus of FIG. 1 in providing the spline interpolation between user-specified points.

The flow chart of FIG. 11 gives an overview of the operation of the apparatus, and includes operations of the definer/editor 102, the view controller 106, projector 108 and the renderer 110. Of particular interest for the present description, however, is the definition of spline objects to interpolate points defined by a user as performed by the definer/editor 102. The flow chart begins at step 1100 and continues as follows. At step 1102 a previously undefined number N of control values are received from the user through the input means 30, these defining N points $P_1$ to $P_N$ in a two or three-dimensional space. At 1104 the user is invited to select from a range fo available functions for further processing of the received points, for example to indicate that a curve is desired to pass through the points $P_1$ to $P_N$ in accordance with a B-spline interpolation function.

Other functions might for example include polygon definition, replicating a previously defined object at the specified locations or whatever.

Assuming B-spline interpolation is selected control passes to step 1106 where the user is asked to specify ends selected between an open-ended or closed curve. When an open-ended curve is desired the user is invited to specify the end gradients $g_1$ to $g_N$ (step 1108). At this point the user can choose simply to specify the default values $g_1=g_N=0$. If a closed curve is to be generated, then the end constraints are implicit and step 1108 is not required.

As far as the user is concerned, the desired curve is now defined and the definer/editor 102 proceeds to generate phantom points as in the above examples. In view of the different processes involved, separate modules 1110a and 1110b are provided to generate phantom points for the open ended and closed curve cases respectively. These modules will be described in more detail with reference to FIGS. 12(a), 12(b), 13(a) and 13(b). At step 1112 the generated phantom points are stored together with necessary control information as a spline object definition in an object data base in the apparatus memory (20, 60 FIG. 1). At this point control may be returned to step 1102 if more curves are required, or if for example a set of curves defining a spline surface patch is to be processed.

Once the object data base is complete the view controller 106 and the projector 108 operate (step 1114) to transform the spline object definition in accordance with a viewing direction and object orientation in a conventional manner. At step 1116 the renderer 110 renders the spline object onto the display screen or other image recording medium, interpolating between the transformed phantom points using the spline weighting functions, again in a conventional manner. At 1118 control may be returned repeatedly to the steps 1114 and 1116 to render images of the object in the object data base as seen from various positions and angles. The view position for each iteration may be defined interactively by the user, or it may be defined in accordance with a predetermined trajectory. This trajectory itself may be a spline object defined by the definer editor 102 as described above, such that the viewing position interpolates smoothly a series of points defined by the user.

Figure 12A:
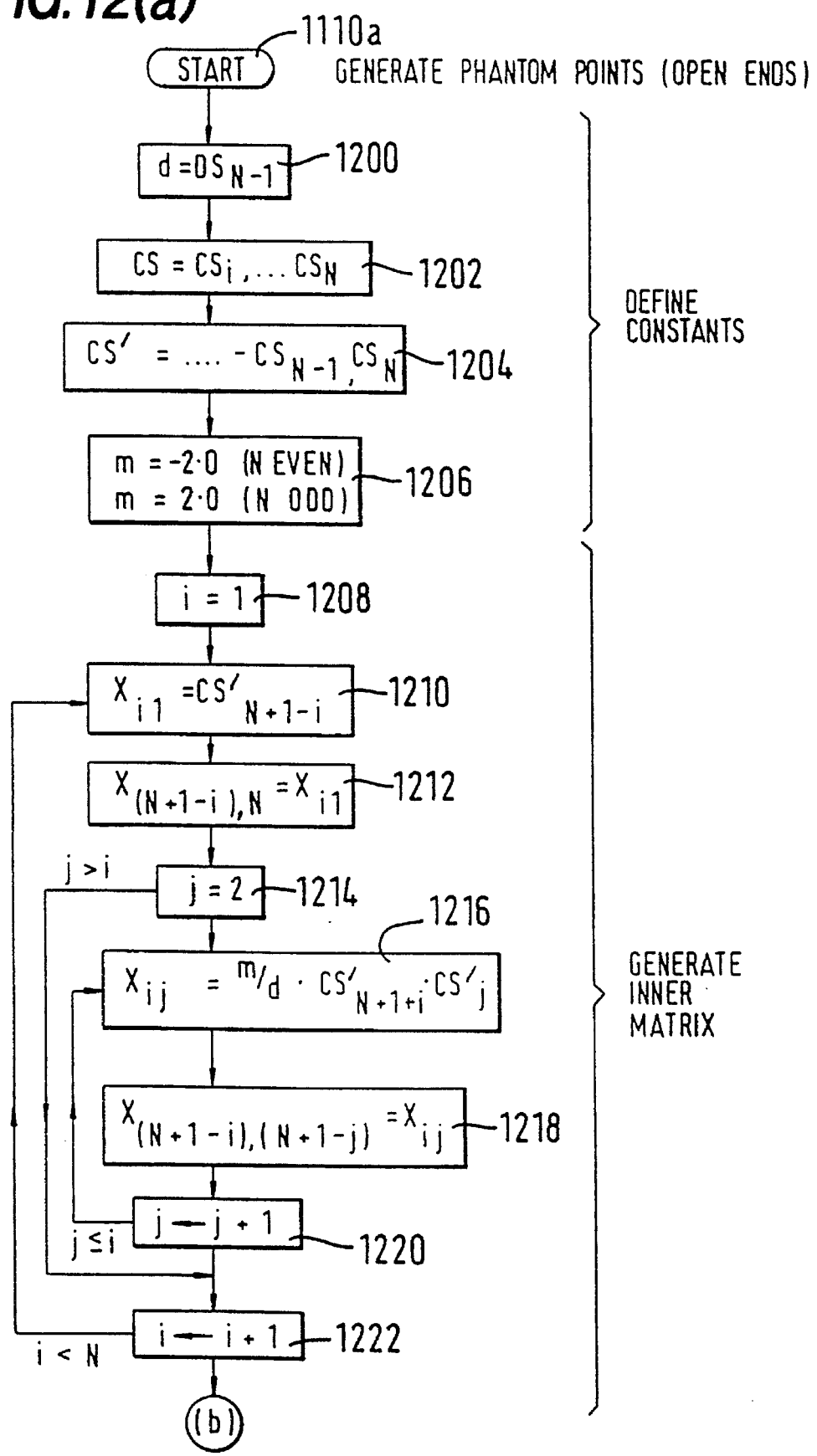
FIGS. 12(a) and 12(b) show in more detail parts of the flow chart of FIG. 11 in particular for the case of a open-ended curve.

FIGS. 12(a) and (b) are first and second parts of a flow chart defining the operation of the apparatus in generating phantom points for an open ended curve, that is to say the operations of step 1110a in FIG. 11. At step 1200 the divisor d is calculated, this being defined as the (N−1)th term of the divisor series DS. For this purpose the values of the divisor series may be pre-stored to an arbitrary length, or may be generated as required. In step 1202 the column series CS is generated to a length of N terms, and in step 1204 is modified to generate the modified column series CS', as described above. At step 1206 the multiplier M is set either to −2.0 or 2.0, depending on whether N is even or odd respectively. Having generated the necessary constants for the calculation of the coefficients forming the inverse of the matrix $M^{-1}$, the apparatus continues in steps 1208 to 1222 to generate the inner part of this coefficient matrix.

Steps 1208 and 1222 define a "FOR loop", whereby the index i steps from 1 in increments of 1 up to the value of N, so as to address in turn each row of the inner matrix. At step 1210 the first entry $X_{i1}$ of the current row i is generated by copying the term $CS'_{N+1-i}$ from the modified column series. Rather than perform a separate FOR loop for the copying step corresponding to step (e) shown in FIG. 5(e), the apparatus immediately copies (step 1212) the value $X_{i1}$ to generate the diagonally opposite value $X_{(N+1-i)N}$. Steps 1214 and 1220 define an inner "FOR loop" whereby an index j is incremented to address the further entries in row i, as required to address the lower diagonal half of the inner matrix. Index j is set initially to the value 2 in step 1214 and if the index i is still equal to 1, control passes directly to step 1222. Otherwise each coefficient $X_{ij}$ is calculated in step 1216 using the multiplier m, the divisor d and two entries from the modified column series CS', in accordance with the example. Again at step 1212 the entry $X_{ij}$ just found is copied to the diagonally opposite entry, $X_{(N+1-i),(N+1-j)}$, as required by the symetry of the matrix. After all rows from i=1 to N of the inner matrix have been generated, control passes to step 1224 in FIG. 12(b).

At step 1224 the gradients at the ends of the curve are examined and further processing is performed depending on whether or not the default values $g_1=g_N=0$ have been selected for the end gradients. When the default values apply, processing is simplified as described above in relation to the example of FIGS. 5(a) to 5(i), and the phanton points $A_0$ to $A_{N+1}$ can be generated directly from the coefficients of the inner matrix in accordance with steps 1226 to 1234. Steps 1226 and 1230 define a FOR loop with index i running from 1 to N, while step 1228 within the loop generates the corresponding phantom point $A_i$. In accordance with the definition of matrix multiplication, $A_i$ is defined as a sum over columns j=1 to N of the corresponding coefficient $X_{ij}$ times the relevant component of the received point $P_j$.

With the default end conditions selected, point $A_0$ is then be generated in step 1232 merely by copying the point $A_2$, while point $A_{N+1}$ is generated at step 1234 by copying the point $A_{N-1}$. All phantom points A0 to $A_{N+1}$ have thus been generated.

Returning to step 1224 if the default conditions do not apply, the outer rows and columns of coefficients in the matrix must be calculated before generating the phantom points. For this purpose steps 1236 and 1242 define a FOR loop containing steps 1238, such that the index j runs from 1 to N to address each column of the matrix in turn. In step 1238 the coefficient $X_{0j}$ in the first row and the current column is generated by copying the coefficient $X_{2j}$ from the third row. Similarly in step 1240 the coefficient $X_{(N+1)j}$ in the last row is generated by copying the entry from the third last row $X_{(N-1),j}$.

Then at step 1244, the first entry $X_{00}$ in the first column is generated from the entry to the right of it, in accordance with the formula derived in the example (FIG. 6). In step 1246 the entry $X_{00}$ is copied and negated to generate the diagonally opposite entry $X_{(N+1),(N+1)}$. Steps 1248 and 1254 define a FOR loop containing steps 1250 and 1252, so as to generate the remaining coefficients in the first and last columns, by addressing rows i=1 to N+1. In step 1250 the coefficient $X_{i0}$ is generated from the coefficient $X_{i1}$ in accordance with the formula derived in the example and in step 1252 this is copied and negated to generate the diagonally opposite coefficient $X_{(N+1-i),N}$.

Now the complete coefficient matrix $M^{-1}$ has been generated, the phantom points $A_0$ to $A_{N+1}$ can be generated. Steps 1256 and 1260 define a loop with index value i running from 0 to N+1 inclusive, and step 1258 within the loop generates the corresponding phantom point $A_i$ by a summation along the current row i in accordance again with the normal rules of matrix multiplication.

FIG. 13(*a*) provides the flow chart for the generation of phantom points in the case of a closed curve, (step 1110*b* of FIG. 11). In step 1300 the divisor series DS is generated in accordance with predetermined rules, which it will be remembered from the example depend on whether the number N of received control points is odd or even. In step 1302 the divisor d is determined, this being the term $DS_{(N+1)/2}$ of the divisor series. While ordinary floating point arithmetic applies to the calculation of the coefficients and phantom points in the present appartus, it is important to remember that the indexes i and j in these examples are calculated using integer arithmetic circuits only. The effects of this are illustrated in FIG. 14, in which the table shows values of N ranging from 7 to 14 the values of (N−1)/2, N/2, and (N+1)/2. In terms of normal arithmetic, the meaning of these expressions will depend on whether N is odd or even as illustrated. It will be seen for example that the value of the divisor d will be exactly the sixth term in the divisor series, when N is either 11 or 12.

At step 1304 the row series RS is calculated to a total of N/2+1 terms. In step 1306 the modified row series RS' is generated in accordance with the rules described above, that is to say by negating every second term starting from the penultimate term and working backwards. As noted above in the closed curve examples, it is not necessary to generate the coefficient matrix completely in order to generate the phantom points $A_i$. Accordingly, in the apparatus operating and according to the flow chart of FIG. 13(*a*), the phantom points are generated directly using the values of the modified row series RS' as coefficients. Steps 1308 and 1312 define a loop containing step 1310, such that the value of i runs from 1 to N, addressing each phantom point $A_i$ in turn. Division by d is performed once for each phantom point only, in contrast to the example above, but with the same end result. Within the formula shown in step 1310, there are three terms, two of them comprising summations. The middle term multiplies the largest of the coefficients $RS'_{N/2+1}/d$ by the received point $P_i$ which corresponds to the phantom point $A_i$ currently being generated. To the left of this a summation with j running from 1 to N/2 multiplies the series of coefficients defined by RS' by the corresponding points $P_{(i-j)}$ to the left of $P_i$. Similarly a second summation with j running from 1 to (N−1)/2 includes contributions from the points $P_{(i+j)}$ to the right of the point $P_i$. As indicated at FIG. 13(*b*) the indexes (i−j) and (i+j) are modified by a "modulo-N" function (% N) to achieve the correct "wrap-around" from point $P_1$ leftwards to $P_N$, and from point $P_N$ rightwards to $P_i$. Having generated the phantom points $A_1$ to $A_N$ which are necessary to define the closed curve, the apparatus proceeds in step 1314 to generate further points $A_0$, $A_{N+1}$ and $A_{N+2}$, by copying the points $A_N$, $A_1$ and $A_2$ respectively. An advantage of this is that the spline curve rendering step 1116 (FIG. 11) can operate with no distinction between open ended and closed curves, by supplying it with this enlarged set of points $A_0$ to $A_{N+2}$, which will nevertheless result in the desired closed curve being rendered.

It will be appreciated from the above that the apparatus as described provides a method of defining spline objects which interpolate N points received from the user, without the need to construct and invert an N by N matrix of coefficients, as proposed in the prior art. In particular, it has been shown that a set of phantom points can be generated from the received points using coefficients generated directly from a simple and a predetermined set of rules. Once the type of curve has been defined (B spline in the examples), the only variable for the purpose of implementing these rules is effectively the number N of received points. The number of calculations required to be performed by the processor, in particular the number of time consuming division and multiplication operations, is reduced in the above apparatus, and tends to increase only linearly with increasing N. Therefore the apparatus as described can operate with arbitrarily large numbers of received points, and in particular can generate a cruve interpolating a given number of points more quickly than systems known hitherto, in particular so that the user can see interactively the effect on the spline object caused when new points are input or existing points are moved.

Approximation Mode

Nevertheless, for true interactive operation even the above apparatus can become slow when implemented on a commonplace personal computer and faced with a very large number of points to be interpolated. Accordingly, an embodiment will now be described in which approximate interpolation of received points is achieved, in particular for interactive operation on a display screen of the apparatus, by a simple modification of the apparatus as described so far. Referring to the overview of operation provided by the flow chart of FIG. 11, it is shown by a dotted line that the function selection step 1104 of the apparatus permits the user now to select an approximate interpolating option distinct from the full B-spline interpolating option which is implemented by steps 1106 to 1112.

The principal of operation in the approximate interpolation mode is as follows. As mentioned previously, it is strictly speaking true to say that each phantom point position $A_i$ depends upon every one of the N received control points $P_1$ to $P_N$, with the corollary that the inverse matrix of coefficients $M^{-1}$ has a non-zero coefficient in every position. In practice, however, for large values of N, it can be observed that the coefficients of the inverse matrix which are far from the main diagonal tend towards zero. In other words, while all of the points $P_1$ to $P_N$ contribute in theory to the position of the phantom point $A_i$, the major influence on the position $A_i$ comes from the corresponding received point $P_i$ and those points closest to it. Accordingly, the approximate interpolation function of the present apparatus operates to generate an approximate set of phantom points $A_i$ corresponding to the received points $P_i$, wherein each approximate phantom point $A_i$ includes contributions only from the received point $P_i$ and a number of its nearest neighbours, which number can be choosen to achieve any desired degree of accuracy. To this end the apparatus generates a set of coefficients as in the exact interpolation examples above, but for a number N' of points smaller than the actual number N of received points. These coefficients are then applied to the received points in the manner of a "moving window" to generate each point $A_i$ in turn.

Figures 15A, 15B:
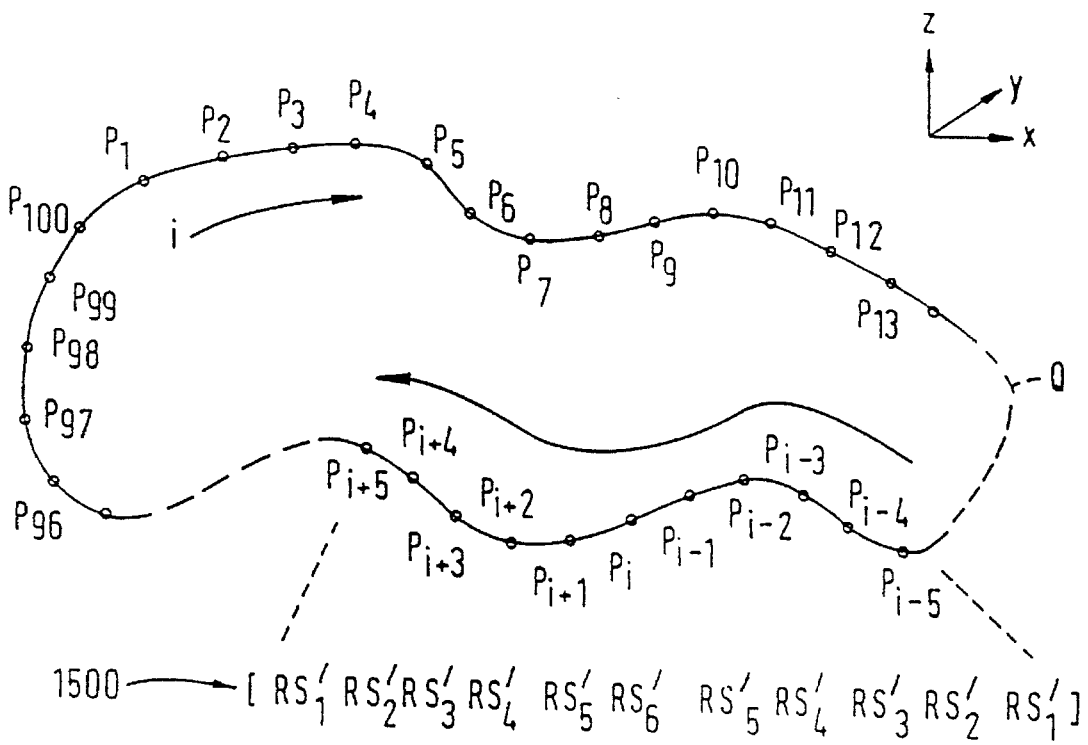
FIGS. 15(a) and 15(b) illustrate the generation of phantom points providing approximate interpolation of a large number N=100 received points defining a closed curve.

FIGS. 15(*a*) and 15(*b*) illustrates the operation of the approximate interpolation function of the apparatus, for the case of a closed curve with N=100 received points. The degree of accuracy required in this example has been set such that N'=11. Accordingly, a kernel of coefficients is generated from a modified row series RS' as illustrated at 1500 in FIG. 15(a). The operations required to generate this kernel are exactly those illustrated in the flow chart of FIG. 13(a) steps 1300 to 1306, but with the value N' used instead of the total number N of received points. Accordingly, the kernel 1500 is exactly the same as the row of coefficients derived in step (f), shown in FIG. 10(f).

Having defined a set of N' coefficients, the approximate phantom point positions $A_i$ can be generated for i=1 to N using the formula shown in FIG. 15(b). It will be seen that this formula is identical to that used in step 1310 of FIG. 13(a), but with the value of N' used instead of N itself to determine the range of values of j. Thus, in the two summation terms only the five received points on either side of point $P_i$ are indexed by means of a modulo-N function to provide the required wrap-around from point $P_{100}$ to point $P_1$ and vise versa. As in the exact interpolation examples, additional points $A_0$ $A_{101}$ and $A_{102}$ are generated by copying points $A_{100}$ $A_1$ and $A_2$ respectively, to avoid the need for wrap-around to be implemented explicitly in the rendering step 1116 (FIG. 11).

Figure 12B:
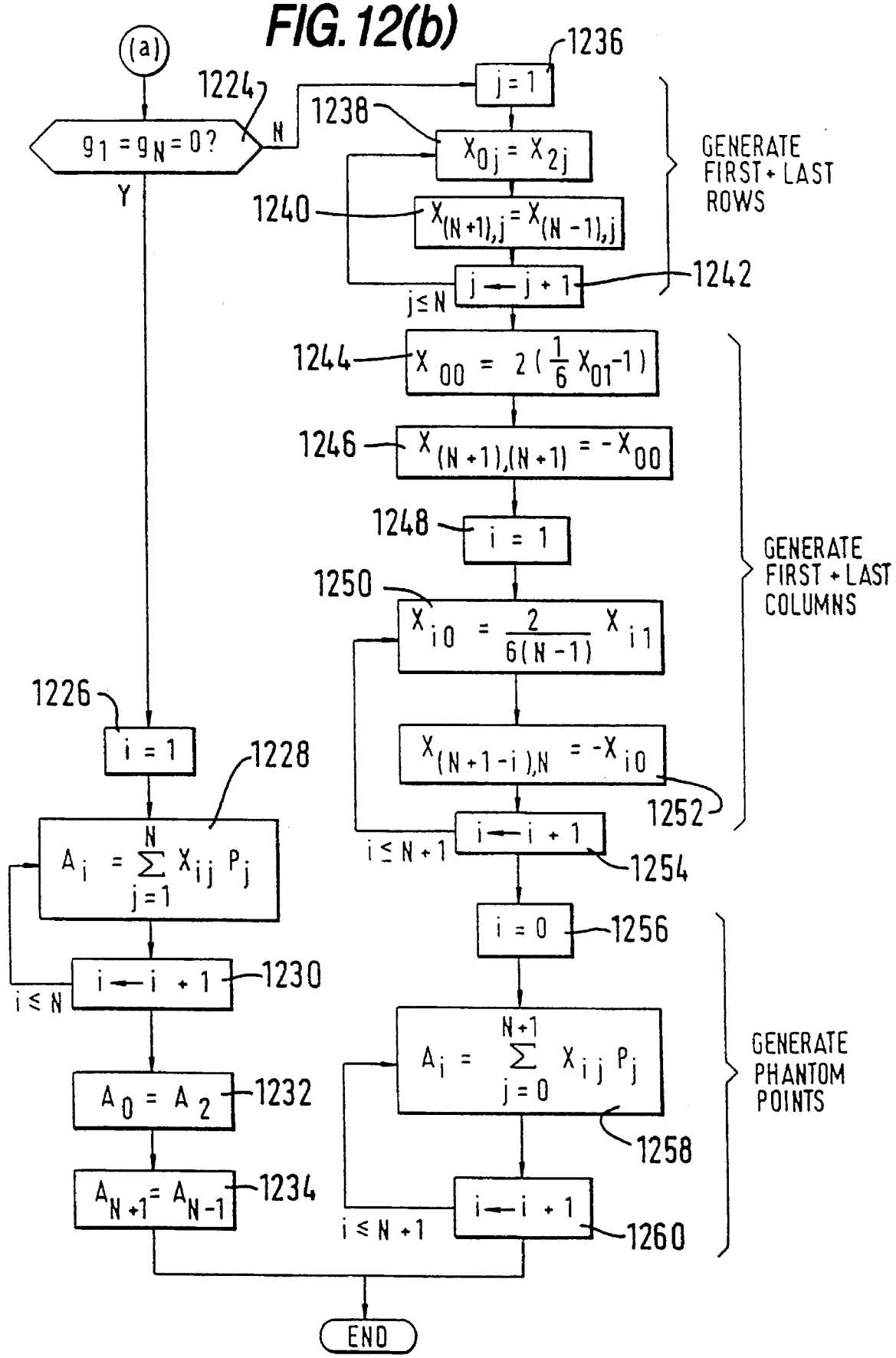
Figures 13A, 13B:
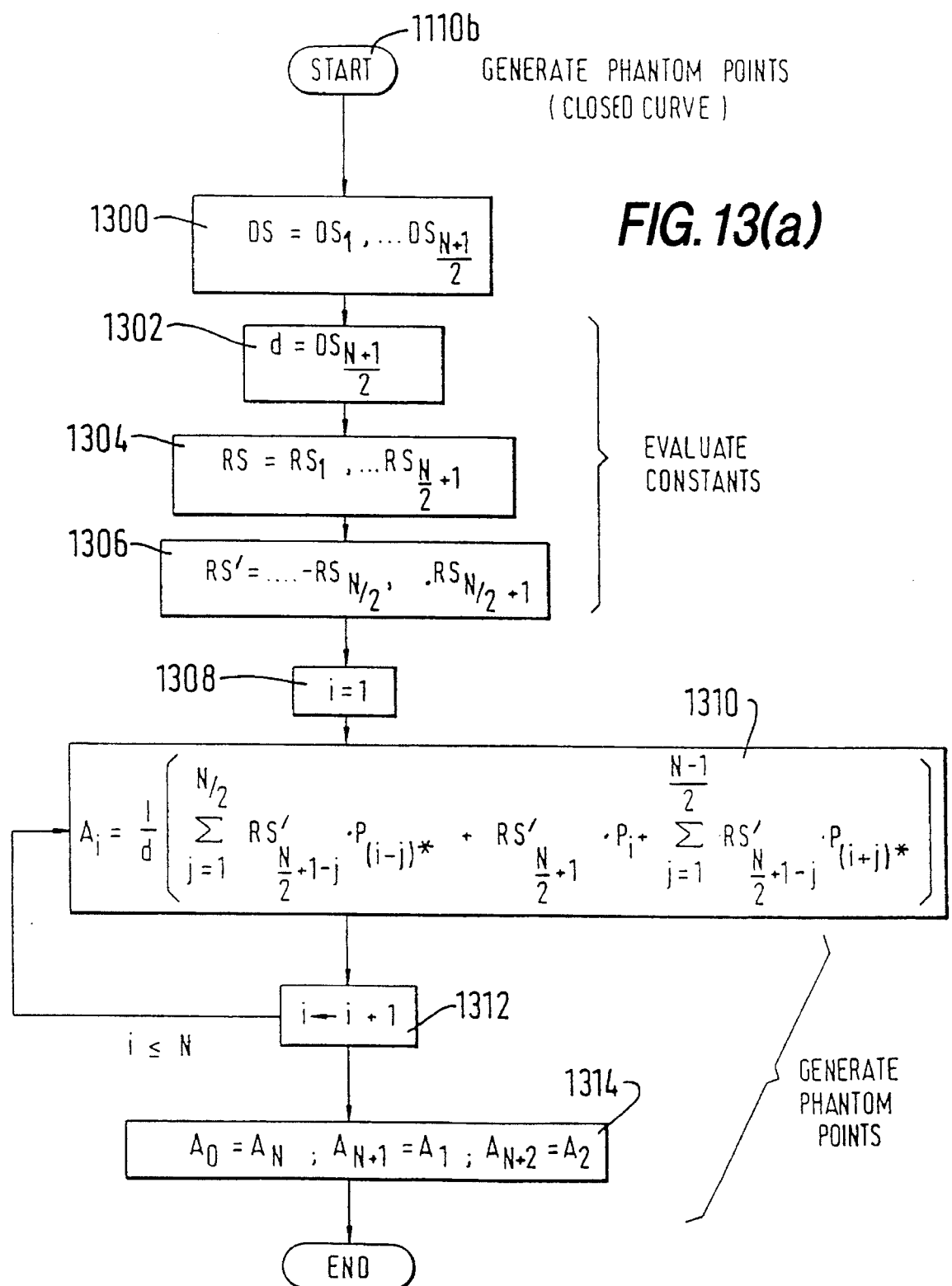
FIGS. 13(a) and 13(b) show in more detail part of the flow chart of FIG. 11 for the case of the closed curve.

FIG. 16 illustrates schematically the operation of the approximate interpolation function of the apparatus, in the case of an open-ended curve also with N=100 received points and also with a desired degree of accuracy set such that N'=11. An array of coefficients corresponding to the inverse matrix generated for exact interpolation in the example of FIGS. 12(a) and 12(b), is generated and illustrated in FIG. 16 with row index i and column index j both running from zero to N'+1=12. In the example of FIG. 16, it is assumed that the default values $g_1=g_N=0$ have been selected for the end gradients, and accordingly the outer columns j=0, 12 of the matrix have not been generated. As in the exact interpolation example N+2, phantom points $A_0$ to $A_{101}$ are generated as follows.

Six of the phantom points $A_1$ to $A_6$ are generated by multiplying the array of received points by respective rows of coefficients i=1 to i=6, exactly in accordance with step 1228 of FIG. 12 (b). The first row (i=0) is identical to the third row (i=2) as mentioned in the previous examples, and the first phantom point $A_0$ is then generated simply by copying point $A_2$. Row i=6 of the matrix of coefficients, shaded in FIG. 16, is then used repeatedly as a "moving window" in a manner similar to the use of the kernel 1500 in FIG. 15(a), to generate a middle sub-set of the phantom points $A_7$ to $A_{95}$. The phantom points from A96 to $A_{100}$ are then generated using their own unique rows of coefficients i=7 to i=11 respectively, and point $A_{101}$ is generated finally by copying point $A_{99}$. Thus a full set of phantom points $A_0$ to $A_{101}$ has been generated defining a spline object, but with each phantom point derived from only eleven nearest neighbours of the total of N=100 received points $P_1$ to $P_{100}$.

The resulting spline object is therefore only an approximate interpolation of the received points, with an accuracy determined by the choosen size of N'. It has been found in practice that for interactive work via a display screen of the order of 1,000 by 1,000 pixels, the inaccuracies introduced by considering only the nearest 10 or 11 pixels are not detectable. Of course, having defined the desired spline object approximately by an interactive process, the user is free to select the slower function of exact B-spline interpolation as described above, in order to generate a completly accurate spline object. This may be necessary for example where in the spline object is to be rendered onto a high resolution image recording medium such as 35 mm film, and would also be of interest in systems where the spline curve defines the trajectory of a machine tool or robot actuator.

Figure 17:
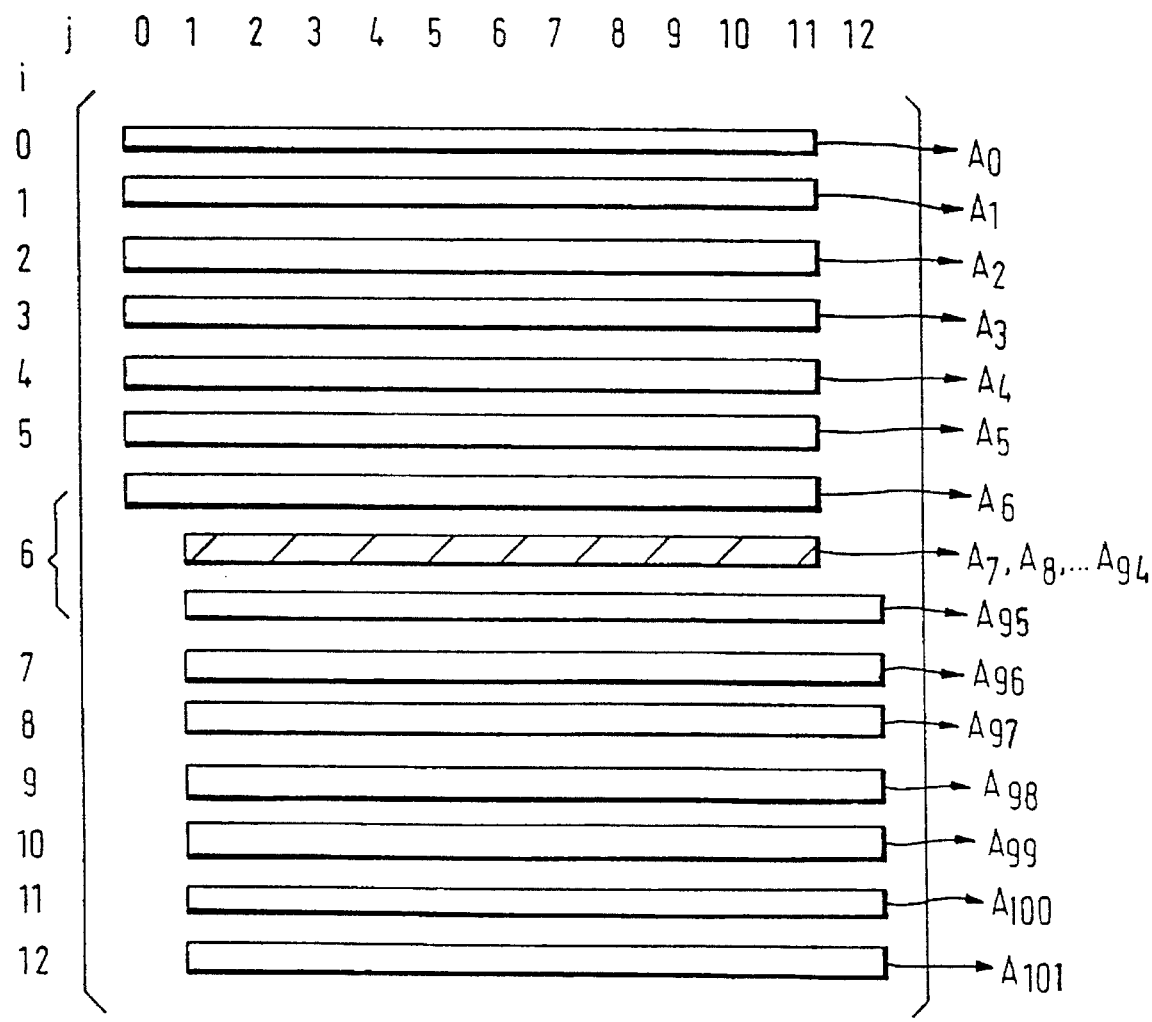
FIG. 17 illustrates the generation of phantom points for the approximate interpolation of an open-ended curve where end gradients are specified by the user.

For situations where the default values of the end gradients have not been chosen, that is when $g_1$ and/or $g_N$ is non-zero, then the outer columns and rows of the matrix of coefficients should be generated explicitly. In such a case, the operation of the approximate interpolation function is slightly more complicated as illustrated in FIG. 17. The matrix of non-zero coefficients is represented in FIG. 17 in a similar manner to the representation of FIG. 16, but with the row i=6 expanded into three rows for the purpose of this illustration only. As before, a first sub-set, a middle sub-set and a last sub-set of the phantom points are generated. The first sub-set of phantom points comprises the points $A_0$ to $A_6$, and each of these is generated using a respective row i=0 to i=6 of the matrix of coefficients, but without using the entry in the last column (j=12), because these last coefficients relate to an end gradient which is not defined. For the middle sub-set of points $A_7$ to $A_{94}$ the row i=6 of coefficients (shaded in FIG. 17) is used repeatedly as a moving window, but ignoring both the first and last entries (j=0, 12). Finally, the last sub-set of points is generated from $A_{95}$ to $A_{101}$, using respectively the rows i=6 to i=12 of the matrix of coefficients, this time ignoring the coefficients of the first column j=0, because no left hand gradient constraint is available.

The skilled reader will be able to conceive of many different implementations of the apparatus for performing the operations described. A general prupose computer appartus may for example be programmed in 'C' or some other high-level language, to define a routine including all operations necessary to render a spline curve from a received set of points, for example in accordance with the above flow-charts. The routine might for example allow the specification of a limit on the number (N') of "significant points" to be combined into each phantom point in order to implement the approximate interpolation function as just described. Then, if the number of significant points specified is set high enough that it equals or exceeds the total number of received points, an exact interpolation will be achieved. The routine may cover all possibilities or just a subset of them; for example it may assume the default condition that the end gradients of an open-ended curve are both zero.

Having obtained the required set of phantom points in accordance with the required type of curve (closed or open-ended). The routine might also provide a function to calculate the position of any desired point on the spline curve, whose control points are those phantom points. This might generate a complete set of points, to a given resolution specified number of samples, or might simply return one point on the curve in response to a specified value of the curve parameter.

The skilled reader will readily appreciate that many other implementations of the principles of the invention are possible, aside from the specific examples described above. The techniques may readily be extended to define curved surfaces, in terms of a network of spline curves, in a manner well-known in the art. Furthermore the applications of the techniques in computer graphics are many and varied, and these techniques may moreover find application in other fields such as robotics and numerical control. Accordingly, the scope of the present invention is in no way limited to the above examples, nor to the applications specifically described.

I claim:

1. A computer graphics apparatus for generating image data representing a graphic object having a curved shape, the curved shape approximately interpolating a set of N control points, comprising:

means for receiving electrical signals defining the set of N control points;

processing means for processing the electrical signals to generate a set of phantom control points, comprising means for combining respective subsets of N' (fewer than N) of the control points in accordance with a set of N' coefficients, such that the set of N' coefficients is used repeatedly and combined with a respective different subset of the control points to generate each of at least a middle subset of the phantom control points;

means for storing the set of phantom control points generated by the processing means as part of an object database for subsequent use in generating the image data;

generating means for generating one or more interpolated points by using the phantom control points stored in the object database in a parametric equation, so as to generate the image data, the interpolated points representing the curved shape of the object.

2. An apparatus according to claim 1, wherein sid generating means generates the interpolated points using the phantom control points in a parametric equation defining a parametric cubic curve.

3. An apparatus according to claim 2, wherein said parametric cubic curve is a B-spline curve.

4. An apparatus according to claim 1, wherein the control points form a closed sequence defining a closed curved shape, and wherein the processing means generates each phantom control point of the middle subset and each other phantom control point by using repeatedly the set of N' coefficients.

5. An apparatus according to claim 1, wherein the curved shape is open-ended, and wherein the processing means comprises means to store plural sets of coefficients to define rows of a two-dimensional coefficient matrix, and generates a first subset of the phantom control points by combining a first subset of the control points in accordance with respective rows of a first subset of the rows of the coefficient matrix, generates a last subset of the phantom control points by combining respective rows of a last subset of the rows of the coefficient matrix with a last subset of the control points, and generates the middle subset of the phantom control points by combining a middle row of the coefficient matrix with respective subsets of the control points.

6. An apparatus according to claim 5, wherein the processing means assumes default end conditions for the curved shape, such that coefficients in a first and a last column of the coefficient matrix need not be stored.

7. An apparatus according to claim 1, wherein the processing means further comprises:

a) means for determining whether the number N of points in the set of control points is below a predetermined number; and b) means for combining, when it is determined that said number N is below said predetermined number, all the set of control points in accordance with a set of coefficients generated for each phantom point respectively, said sets of coefficients being dependent on the number N.

8. An apparatus according to claim 7, further comprising means for generating directly each set of coefficients for each phantom point, in accordance with predetermined rules, in response to the electrical signals.

9. An apparatus according to claim 7, wherein said predetermined number is set on the basis of a resolution of a display on which the image data is to be displayed.

10. An apparatus according to claim 9, wherein said predetermined number is a number selected from 5 to 20.

11. An apparatus according to claim 9, wherein said predetermined number is 11.

12. An apparatus according to claim 1, further comprising coefficient generating means for generating the set of coefficients for a given value of N' by storing terms of at least one numerical sequence and selecting the terms therefrom as selected terms in accordance with predetermined rules.

13. An apparatus according to claim 12, wherein the numerical sequence is defined by a recurrence relation.

14. An apparatus according to claim 13, wherein the numerical sequence is further determined by one or more starting values selected in accordance with a desired type of curved shape.

15. An apparatus according to claim 14, wherein said one or more starting values depends on one or more of (i) whether a closed or open curved shape is desired and (ii) whether the number N' of coefficients is odd or even.

16. An apparatus according to claim 12, wherein the coefficient generating means negates certain terms of the sequence in an alternating fashion, prior to selecting the terms therefrom.

17. An apparatus according to claim 13, wherein said recurrence relation defines a term of the sequence to be four times the preceding term, minus the term before the preceding term.

18. An apparatus according to claim 14, wherein the coefficient generating means further comprises means to define a further numerical sequence, and means to select a divisor from the further sequence in accordance with the number N' of coefficients, and to apply the divisor to the selected terms to generate the coefficients.

19. In a computer graphics apparatus having a processor for processing electrical signals defining a set of N control points, a method of processing the signals to generate image data representing a graphic object having a curved shape which approximately interpolates the control points, the method comprising the steps of:

generating from the control points a set of phantom control points by combining respective subsets of N' (fewer than N) of the control points in accordance with a set of N' coefficients, such that the set of N' coefficients is used repeatedly and combined with a respective different subset of the control points to generate each of at least a middle subset of the phantom control points;

storing the set of phantom control points as part of an object database for subsequent use in generating the image data; and generating one or more interpolated points by using the phantom control points stored in the object database in a parametric equation so as to generate the image data, the interpolated points representing the curved shape of the object.

20. A method according to claim 19, wherein said parametric equation defines a parametric cubic curve.

21. A method according to claim 20, wherein said parametric cubic curve is a B-spline curve.

22. A method according to claim 19, wherein the control points form a closed sequence defining a closed curved shape, and wherein, in the step of generating the set of phantom control points, each phantom control point of the middle subset and each other phantom control point is generated by repeatedly using the set of N' coefficients.

23. A method according to claim 19, wherein the curved shape is open-ended, and wherein, in the step of generating the set of phantom control points, plural sets of coefficients are stored to define rows of a two-dimensional coefficient matrix, and a first subset of the phantom control points is generated by combining a first subset of the control points in accordance with respective rows of a first subset of the rows of the coefficient matrix, a last subset of the phantom control points is generated by combining respective rows of a last subset of the rows of the coefficient matrix with a last subset of the control points, and a middle subset of the phantom control points is generated by combining a middle row of the coefficient matrix with respective subsets of the control points.

24. A method according to claim 23, wherein, in the step of generating the set of phantom control points, default end conditions are assumed for the curved shape, such that coefficients in a first and a last column of the coefficient matrix need not be stored.

25. A method according to claim 19, wherein the step of generating the set of phantom control points further comprises the steps of:
a) determining whether the number N of points in the set of control points is below a predetermined number; and
b) when it is determined that said number N is below said predetermined number, combining all the set of control points in accordance with a set of coefficients generated for each phantom point respectively, said sets of coefficients being dependent on the number N.

26. A method according to claim 25, further comprising the step of generating directly each set of coefficients for each phantom point, in accordance with predetermined rules, in response to the number N of control points.

27. A method according to claim 25, wherein the image data is displayed on a display apparatus having a resolution and wherein said predetermined number is set on the basis of the resolution.

28. A method according to claim 27, wherein said predetermined number is a number selected from 5 to 20.

29. A method according to claim 27, wherein said predetermined number is 11.

30. A method according to claim 19, further comprising the step of generating the set of coefficients for a given value of N' by storing terms of at least one numerical sequence and selecting the terms therefrom as selected terms in accordance with predetermined rules.

31. A method according to claim 30, wherein the numerical sequence is defined by a recurrence relation.

32. A method according to claim 31, wherein the numerical sequence is further determined by one or more starting values selected in accordance with a desired type of curved shape.

33. A method according to claim 32, wherein said one or more starting values depends on one or more of (i) whether a closed or open curved shape is desired and (ii) whether the number N' of coefficients values is odd or even.

34. A method according to claim 30, wherein, in the step of generating the set of coefficients, certain terms of the sequence are negated in an alternating fashion, prior to selecting the terms therefrom.

35. A method according to claim 31, wherein said recurrence relation defines a term of the sequence to be four times the preceding term, minus the term before the preceding term.

36. A method according to claim 32, wherein, in the step of generating the set of coefficients, a further numerical sequence is defined, a divisor is selected from the further sequence in accordance with the number N' of coefficients, and the division is applied to the selected terms to generate the coefficients.

37. A method according to claim 19, further comprising the step of generating a signal conveying the image data.

38. A method according to claim 37, further comprising the step of recording the signal.

39. A computer-usable medium having computer-readable instructions stored therein for causing a processor in a computer graphics apparatus to process electrical signals defining a set of N control points to generate image data representing a graphic object having a curved shape which approximately interpolates the control points, said instructions comprising instructions for:

causing the processor to generate from the control points a set of phantom control points by combining respective subsets of N' (fewer than N) of the control points in accordance with a set of N' coefficients, such that the set of N' coefficients is used repeatedly and combined with a respective different subset of the control points to generate each of at least a middle subset of the phantom control points;

causing the processor to store the set of phantom control points as part of an object database for subsequent use in generating the image data; and causing the processor to generate one or more interpolated points by using the phantom control points stored in the object database in a parametric equation, so as to generate the image data, the interpolated points representing the curved shape of the object.

40. A computer useable medium according to claim 39, wherein the control points form a closed sequence defining a closed curved shape, and wherein the instructions for causing the processor to generate the set of phantom control points comprise instructions for causing the processor to generate each phantom control point of the middle subset and each other phantom control point by repeatedly using the set of N' coefficients.

41. A computer useable medium according to claim 39, wherein the curved shape is open-ended, and wherein the instructions for causing the processor to generate the set of phantom control points comprise instructions for causing the processor to:

store plural sets of coefficients to define rows of a two-dimensional coefficient matrix; and generate a first subset of the phantom control points by combining a first subset of the control points in accordance with respective rows of a first subset of the rows of the coefficient matrix, generate a last subset of the phantom control points by combining respective rows of a last subset of the rows of the coefficient matrix with a last subset of the control points, and generate a middle subset of the phantom control points by combining a middle row of the coefficient matrix with respective subsets of the control points.

42. A computer graphics apparatus for generating image data defining a sequence of images in which an object is represented as seen from a viewpoint, at least one of the object and the viewpoint having a curved trajectory during the sequence, said trajectory approximately interpolating a set of N control points, the apparatus comprising:

means for receiving electrical signals defining the set of N control points;

processing means for processing the electrical signals to generate a set of phantom control points, comprising means for combining respective subsets of N' (fewer than N) of the control points in accordance with a set of N' coefficients, such that the set of N' coefficients is used repeatedly and combined with a respective different subset of the control points to generate each of at least a middle subset of the phantom control points;

means for storing the set of phantom control points generated by the processing means as part of an object database for subsequent use in generating the image data; and generating means for generating one or more interpolated points by using the phantom control points stored in the object database in a parametric equation, so as to generate the image data, the interpolated points representing the curved trajectory.

43. In a computer graphics apparatus having a processor for processing electrical signals defining a set of N control points, a method of processing the signals to generate image data defining a sequence of images in which an object is represented as seen from a viewpoint, at least one of the object and the viewpoint having a curved trajectory during the sequence, said trajectory approximately interpolating the control points, the method comprising the steps of:

generating from the control points a set of phantom control points by combining respective subsets of N' (fewer than N) of the control points in accordance with a set of N' coefficients, such that the set of N' coefficients is used repeatedly and combined with a respective different subset of the control points to generate each of at least a middle subset of the phantom control points;

storing the set of phantom control points as part of an object database for subsequent use in generating the image data; and generating one or more interpolated points by using the phantom control points stored in the object database in a parametric equation so as to generate the image data, the interpolated points representing the curved shape of the trajectory.

44. A method according to claim 43, further comprising the step of generating a signal conveying the image data.

45. A method according to claim 44, further comprising the step of recording the signal.

46. A computer-useable medium having computer-readable instructions stored therein for causing a processor in a computer graphics apparatus to process electrical signals defining a set of N control points to generate image data defining a sequence of image in which an object is represented as seen from a viewpoint, at least one of the object and the viewpoint having a curved trajectory during the sequence, said trajectory approximately interpolating the control points, said instructions comprising instructions for:

causing the processor to generate from the control points a set of phantom control points by combining respective subsets of N' (fewer than N) of the control points in accordance with a set of N' coefficients, such that the set of N' coefficients is used repeatedly and combined with a respective different subset of the control points to generate each of at least a middle subset of the phantom control points;

causing the processor to store the set of phantom control points as part of an object database for subsequent use in generating the image data; and causing the processor to generate one or more interpolated points by using the phantom control points stored in the object database in a parametric equation, so as to generate the image data, the interpolated points representing the curved shape of the trajectory.

* * * * *

UNITED STATES PATENT AND TRADEMARK OFFICE
CERTIFICATE OF CORRECTION

PATENT NO. : 5,608,856

DATED : March 4, 1997

INVENTOR(S) : THOMAS C. McINALLY

It is certified that error appears in the above-indentified patent and that said Letters Patent is hereby corrected as shown below:

On the title page item:

[56] REFERENCES CITED

Other Publications

""Computer & Graphics", vol. 7, No. 2, July, 1983, GB pp. 149-153, Lozover et al.
"Computer Graphics & Image Processing", vol. 7, No. 3 Jun. 1978, USA pp. 425-437, Yamaguchi.
"Computer Graphics & Image Processing", vol. 14, 1980 USA pp. 203-226, Barsky.
"Computer Vision, Graphics and Image Processing", vol. 52, No. 2, Nov. 1990, USA pp. 264-275 XP172322, Goshtasby et al.
"Computer-Aided Design", vol. 23, No. 10, Dec., 1991, GB pp. 700-706 XP247377, Cheng et al.
"Interactive Computer Graphics; Functional, Procedural and Device-Level Methods", Sec. 6.3.1, pp. 260-264 Peter Burger et al.
B.A. Barsky & S.W. Thomas, "Transpline-A system for representing curves B-Line".
"B-Spline Surface Interpolation Using SLOR Method with Parallel Relaxation", Tech. Rep. No. 94-87, Dept. of Computer Science, University of Kentucky.
"Numerical Recipes in C, The Art of Scientific Computing" by Press, Flannery, Teukolsky & Vetterling, Cambridge Press, 1988
Graphics Gems, pub. by Academic Press Professional, "An Algorithm for automatically Fitting Digitized Curves" by Philip J. Schneider.
"Computer Graphics, Principles and Practice", by Foley

UNITED STATES PATENT AND TRADEMARK OFFICE
CERTIFICATE OF CORRECTION

PATENT NO. : 5,608,856

DATED : March 4, 1997

INVENTOR(S): THOMAS C. McINALLY

It is certified that error appears in the above-identified patent and that said Letters Patent is hereby corrected as shown below:

[56] REFERENCES CITED (Other Publications) continued vanDam et al.
"Computer Vision, Graphics and Image Processing 33 (1986) Mar., No. 3, pp. 346-363, "Automatic Curve Fitting with Quadratic B-spline Functions and its Application to Computer-Assisted Animation" by Yang et al.
"An Introduction to Splines for use in Computer Graphics and Geometric Modeling" by Bartels, Beatty & Barsley, published by Morgan Kaufman." should read
--Lozover et al., "Automatic Construction of a Cubic B-spline Representation for a General Curve", Computer & Graphics, Vol. 7, No. 2, pp. 149-153, July 1983.
F. Yamaguchi, "A New Curve Fitting Method Using a CRT Computer Display", Computer Graphics and Image Processing, Vol. 7, No. 3, pp. 425-437, June 1978.
Barsky et al., "Determining a Set of B-Spline Control Vertices to Generate an Interpolating Surface", Computer Graphics and Image Processing, Vol. 14, pp. 203-226 (1980).
Goshtasby et al., "B-Spline Curves and Surfaces Viewed as Digital Filters", Computer Vision, Graphics and Image Processing, Vol. 52, No. 2, pp. 264-275, November 1990.
Cheng et al., "Interproximation: Interpolation and Approximation Using Cubic Spline Curves", Computer-Aided Design, Vol. 23, No. 10, pp. 700-706, December, 1991.
Burger et al., "Interactive Computer Graphics: Functional, Procedural and Device-Level Methods", published by Addison Wesley, ISBND-201-17439-1, Section 6.3.1, pp. 260-264.

UNITED STATES PATENT AND TRADEMARK OFFICE
CERTIFICATE OF CORRECTION

PATENT NO. : 5,608,856

DATED : March 4, 1997

INVENTOR(S): THOMAS C. McINALLY

Page 3 of 6

It is certified that error appears in the above-identified patent and that said Letters Patent is hereby corrected as shown below:

[56] REFERENCES CITED (Other Publications) continued

Barsky et al., "Transpline - A System for Representing Curves Using Transformations Among Four Spline Formations", Comput. J. 24, No. 3, pp. 271-277, 1981.
Chang et al., "B-Spline Surface Interpolation Using SLOR Method with Parallel Relaxation", Tech. Report No. 94-87, Dept. of Comp. Sci., Univ. of Kentucky, September 1987.
Press et al., "Numerical Recipes in C, The Art of Scientific Computing", published in Cambridge University Press, Sections 2.2 to 2.6 (pp. 37-48); 2.8 (pp. 51-59); 2.10 to 2.11 (pp. 72-84); and 3.3 (pp. 94-98).
P. Schneider, "An Algorithm for Automatically Fitting Digitized Curves", Graphics Gems, Published by Academic Press Professional 1980, pp. 612-626 and 797-807.
Foley et al., "Computer Graphics, Principles and Practice", Second Ed., Addison-Wesley, Sections A-4 and A-5 (pp. 1103-1108).
Yang et al., "Automatic Curve Fitting with Quadratic B-spline Functions and its Applications to Computer-Assisted Animation", Computer Vision, Graphics and Image Processing, 33 (1986), March, No. 3, pp. 346-363.
Bartels et al., "An Introduction to Splines for Use in Computer Graphics and Geometric Modeling", Morgan Kaufman, Chapter 1 (pp. 1 to 3); Chapter 2 (pp. 5 to 8); Chapter 3 to Section 3.4 (pages 9 to 17); Sections 21.3 and 21.4 (pp. 438 to 448).--

UNITED STATES PATENT AND TRADEMARK OFFICE
CERTIFICATE OF CORRECTION

PATENT NO. : 5,608,856

DATED : March 4, 1997

INVENTOR(S): THOMAS C. McINALLY

It is certified that error appears in the above-identified patent and that said Letters Patent is hereby corrected as shown below:

COLUMN 4

Line 1, "schematically" should read --schematically an--.

COLUMN 5

Line 14, "units" should read --unit--.

COLUMN 6

Line 17, "sustantial" should read --substantial--.
  Line 23, "(ie" should read --(i.e.--.

COLUMN 8

Line 29, "centred" should read --centered--.

COLUMN 10

Line 44, "step (i) showing FIG. 5(i)" should read
    --step (i), shown in FIG. 5(i),--.

COLUMN 11

Line 20, "shows (a)" should read --shows--.

COLUMN 12

Line 36, "illustrates" should read --illustrate--.

UNITED STATES PATENT AND TRADEMARK OFFICE
CERTIFICATE OF CORRECTION

PATENT NO.  : 5,608,856

DATED       : March 4, 1997

INVENTOR(S) : THOMAS C. McINALLY

It is certified that error appears in the above-identified patent and that said Letters Patent is hereby corrected as shown below:

<u>COLUMN 13</u>

Line 10, "fo" should read --of--.

<u>COLUMN 14</u>

Line 43, "be" should be deleted.
   Line 55, "$X_{(N+1)}$;" should read --$X_{(N+1)}$--.

<u>COLUMN 16</u>

Line 16, "cruve" should read --curve--.
   Line 62, "illustrates" should read --illustrate--.

<u>COLUMN 17</u>

Line 45, "A96" should read --$A_{96}$--.

<u>COLUMN 18</u>

Line 25, "prupose" should read --purpose--.

<u>COLUMN 19</u>

Line 11, "data;" should read --data; and--
   Line 17, "sid" should read --said--.

UNITED STATES PATENT AND TRADEMARK OFFICE
CERTIFICATE OF CORRECTION

PATENT NO. : 5,608,856
DATED : March 4, 1997
INVENTOR(S) : THOMAS C. McINALLY

It is certified that error appears in the above-indentified patent and that said Letters Patent is hereby corrected as shown below:

COLUMN 22

Line 24, "computer useable" should read
  --computer-usable--.
Line 32, "computer useable" should read
  --computer-usable--.

COLUMN 24

Line 5, "computer useable" should read
  --computer-usable--.

Signed and Sealed this

Eleventh Day of November, 1997

Attest:

BRUCE LEHMAN

Attesting Officer    Commissioner of Patents and Trademarks